US008047314B2

(12) United States Patent
Oba et al.

(10) Patent No.: US 8,047,314 B2
(45) Date of Patent: Nov. 1, 2011

(54) POWER OUTPUT APPARATUS, HYBRID VEHICLE EQUIPPED WITH POWER OUTPUT APPARATUS, AND CONTROL METHOD OF POWER OUTPUT APPARATUS

(75) Inventors: Hidehiro Oba, Aichi-ken (JP); Hiroshi Katsuta, Toyota (JP); Takashi Kawai, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 12/517,412

(22) PCT Filed: Nov. 20, 2007

(86) PCT No.: PCT/JP2007/072448
§ 371 (c)(1),
(2), (4) Date: Jun. 3, 2009

(87) PCT Pub. No.: WO2008/069019
PCT Pub. Date: Jun. 12, 2008

(65) Prior Publication Data
US 2010/0078238 A1    Apr. 1, 2010

(30) Foreign Application Priority Data

Dec. 4, 2006   (JP) ................................ 2006-327274

(51) Int. Cl.
*B60W 10/00*   (2006.01)
(52) U.S. Cl. ............................... 180/65.265; 180/65.28
(58) Field of Classification Search ............. 180/65.265, 180/65.28, 65.285, 65.7; 477/3
See application file for complete search history.

(56) References Cited

U.S. PATENT DOCUMENTS

| 5,935,035 | A  | * | 8/1999  | Schmidt .......................... 475/5 |
| 6,054,844 | A  | * | 4/2000  | Frank ............................. 322/16 |
| 7,024,299 | B2 | * | 4/2006  | Hubbard et al. ................ 701/54 |
| 7,137,919 | B2 | * | 11/2006 | Holmes ........................... 475/5 |
| 7,305,873 | B2 | * | 12/2007 | Hubbard et al. ........... 73/114.11 |
| 7,559,864 | B2 | * | 7/2009  | Maeda et al. ..................... 475/5 |
| 7,562,730 | B2 | * | 7/2009  | Shimizu et al. ............. 180/65.23 |
| 7,572,201 | B2 | * | 8/2009  | Supina et al. ..................... 475/5 |
| 7,575,078 | B2 | * | 8/2009  | Muta et al. ................ 180/65.265 |
| 7,695,387 | B2 | * | 4/2010  | Oba ................................ 475/5 |
| 7,836,986 | B1 | * | 11/2010 | Gillecriosd ................ 180/65.21 |
| 2007/0093341 | A1 | * | 4/2007 | Supina et al. ..................... 475/5 |
| 2008/0015760 | A1 | * | 1/2008 | Yamauchi ....................... 701/67 |

(Continued)

FOREIGN PATENT DOCUMENTS

| JP | 02-157437 A    | 6/1990 |
| JP | 2000-069611 A  | 3/2000 |
| JP | 2003-106389 A  | 4/2003 |
| JP | 2005-008005 A  | 1/2005 |
| JP | 2005-081928 A  | 3/2005 |
| JP | 2005-125876 A  | 5/2005 |
| JP | 2005-155891 A  | 6/2005 |
| JP | 2006-063820 A  | 3/2006 |

*Primary Examiner* — J. Allen Shriver, II
*Assistant Examiner* — Brodie Follman
(74) *Attorney, Agent, or Firm* — Kenyon & Kenyon LLP

(57) ABSTRACT

When a required speed ratio as a required value of a speed ratio between an engine and a driveshaft becomes equal to or less than a lower limit speed ratio that is not more than an n-th shift speed ratio during an n-th speed state of a transmission, a hybrid vehicle controls the engine, two motors, and the transmission to ensure output of power based on a torque demand to the driveshaft while performing an engine rotational speed adjustment of making a rotational speed of the engine equal to a shift rotational speed corresponding to an upper side shift speed ratio or an effective shift speed ratio and a shift from an n-th speed state to an (n+1)-th speed state.

14 Claims, 17 Drawing Sheets

U.S. PATENT DOCUMENTS

| | | | |
|---|---|---|---|
| 2008/0053723 A1* | 3/2008 | Kozarekar | 180/65.2 |
| 2008/0083292 A1* | 4/2008 | Muta et al. | 74/336 R |
| 2008/0312021 A1* | 12/2008 | Oba | 475/5 |
| 2008/0318721 A1* | 12/2008 | Oba et al. | 475/5 |
| 2009/0203495 A1* | 8/2009 | Muta et al. | 477/3 |
| 2009/0250278 A1* | 10/2009 | Kawasaki et al. | 180/65.275 |
| 2009/0255493 A1* | 10/2009 | Ichimoto | 123/90.11 |
| 2009/0259391 A1* | 10/2009 | Ando et al. | 701/113 |
| 2009/0314564 A1* | 12/2009 | Okamura et al. | 180/65.285 |
| 2010/0032217 A1* | 2/2010 | Katsuta et al. | 180/65.23 |
| 2010/0071975 A1* | 3/2010 | Aoki | 180/65.285 |
| 2010/0114460 A1* | 5/2010 | Akimoto | 701/111 |

\* cited by examiner

POWER OUTPUT APPARATUS, HYBRID VEHICLE EQUIPPED WITH POWER OUTPUT APPARATUS, AND CONTROL METHOD OF POWER OUTPUT APPARATUS

This is a 371 national phase application of PCT/JP2007/072448 filed 20 Nov. 2007, claiming priority to Japanese Patent Application No. JP 2006-327274 filed 4 Dec. 2006, the contents of which are incorporated herein by reference.

TECHNICAL FIELD

The present invention relates to a power output apparatus configured to output power to a driveshaft, as well as to a hybrid vehicle equipped with such a power output apparatus and a control method of such a power output apparatus.

BACKGROUND ART

One proposed structure of the power output apparatus includes an internal combustion engine, two motors, a Ravigneaux planetary gear mechanism, and a parallel shaft-type transmission arranged to selectively connect one of two output elements of the planetary gear mechanism, which are respectively connected to the two motors, to an output member (see, for example, Patent Document 1). Another proposed structure of the power output apparatus has a planetary gear mechanism including an input element connected with an internal combustion engine and two output elements respectively connected with two motors, and a parallel shaft-type transmission including two countershafts respectively connected with the corresponding output elements of the planetary gear mechanism and selectively connected with an output shaft (see, for example, Patent Document 2). In the power output apparatuses of these prior art structures, the parallel shaft-type transmission changes over the output element of the planetary gear mechanism to be connected to the output member or the output shaft. Such changeover of the connection varies a torque fraction transmitted to the output member or the output shaft out of the whole output torque of the internal combustion engine.

Patent Document 1: Japanese Patent Laid-Open No. 2005-155891
Patent Document 2: Japanese Patent Laid-Open No. 2003-106389

DISCLOSURE OF THE INVENTION

In these prior art power output apparatuses, in the state where one of the two output elements of the planetary gear mechanism is currently connected with the output member or the output shaft, the rotational speed of the currently unconnected other output element is made equal to a predetermined synchronizing rotational speed to allow connection of the other output element with the output member or the output shaft. The new connection of the other output element with the output member or the output shaft in combination with the release of the previous connection of one output element with the output member or the output shaft accomplishes a changeover of the output element of the planetary gear mechanism to be connected with the output member or the output shaft. The above cited patent documents, however, have no description about the concrete procedure of changing over the output element of the planetary gear mechanism to be connected with the output member or the output shaft. In the prior art power output apparatuses, it is thus actually very difficult to improve the power transmission efficiency between the internal combustion engine and the output member or the output shaft.

In a power output apparatus where one of a first element and a second element of a power distribution integration mechanism is selectively connectable with a driveshaft, there would thus be a demand for adequately changing over a status between connection of the first element of the power distribution integration mechanism with the driveshaft and connection of the second element of the power distribution integration mechanism with the driveshaft. In a power output apparatus, a hybrid vehicle equipped with the power output apparatus, and a control method of the power output apparatus, there would be a demand for improving a power transmission efficiency in a wider driving range.

The present invention accomplishes at least part of the demand mentioned above and the other relevant demands by the following configurations applied to the power output apparatus, the hybrid vehicle equipped with the power output apparatus, and the control method of the power output apparatus.

The power output apparatus according to the present invention is a power output apparatus configured to output power to a driveshaft. The power output apparatus includes: an internal combustion engine; a first motor constructed to input and output power; a second motor constructed to input and output power; an accumulator arranged to supply and receive electric power from each of the first motor and the second motor; a power distribution integration mechanism configured to have a first element connected to a rotating shaft of the first motor, a second element connected to a rotating shaft of the second motor, and a third element connected to an engine shaft of the internal combustion engine, the power distribution integration mechanism allowing mutually differential rotations of the three elements; a speed change-transmission assembly constructed to selectively connect either the first element or the second element of the power distribution integration mechanism to the driveshaft and set a speed change state selected among multiple different speed change states, the speed change-transmission assembly configured to, when a speed ratio between the engine shaft and the driveshaft becomes a predetermined shift speed ratio in an n-th speed state where one of the first element and the second element is connected to the driveshaft, shift the speed change state from the n-th speed state to an (n+1)-th speed state where the other of the first element and the second element is connected to the driveshaft so as to set the speed ratio between the engine shaft and the driveshaft to a smaller value; a power demand setting module configured to set a power demand that is power required for the driveshaft; a required speed ratio setting module configured to set a required speed ratio based on the set power demand and a predetermined restriction, the required speed ratio being a required value of the speed ratio between the engine shaft and the driveshaft; and a speed change controller configured to, when the required speed ratio becomes equal to or less than a predetermined lower limit speed ratio that is not more than the predetermined shift speed ratio during the n-th speed state of the speed change-transmission assembly, control the internal combustion engine, the first motor, the second motor, and the speed change-transmission assembly so as to ensure output of power equivalent to the set power demand to the driveshaft while performing an engine rotational speed adjustment of making a rotational speed of the engine shaft equal to a shift rotational speed corresponding to the shift speed ratio and a shift of the speed change state from the n-th speed state to the (n+1)-th speed state.

In the power output apparatus, when the required speed ratio as the required value of the speed ratio between the engine shaft and the driveshaft becomes equal to or less than the predetermined lower limit speed ratio that is less than the predetermined shift speed ratio during the n-th speed state of the speed change-transmission assembly, the internal combustion engine, the first motor, the second motor, and the speed change-transmission assembly are controlled so as to ensure output of power equivalent to the set power demand to the driveshaft while performing the engine rotational speed adjustment of making the rotational speed of the engine shaft equal to the shift rotational speed corresponding to the predetermined shift speed ratio and the shift of the speed change state from the n-th speed state to the (n+1)-th speed state. Instead of a shift of the speed change state of the speed change-transmission assembly (the element of the power distribution integration mechanism connected to the driveshaft) at the stage when the required speed ratio reaches the shift speed ratio, the power output apparatus of this aspect of the invention makes a shift of the speed change state at the stage when the required speed ratio becomes equal to or less than the lower limit speed ratio that is less than the shift speed ratio. The lower speed ratio between the engine shaft and the driveshaft leads to the higher power transmission efficiency between the internal combustion engine and the driveshaft, there by further improving the power transmission efficiency between the internal combustion engine and the driveshaft. When the required speed ratio becomes equal to or less than the lower limit speed ratio during the n-th speed state of the speed change-transmission assembly, the engine rotational speed adjustment in combination with the shift from the n-th speed state to the (n+1)-th speed state ensures a smooth shift of the speed change state of the speed change-transmission assembly, while effectively preventing an excess increase of the rotational speed of the internal combustion engine. Thus, the power output apparatus allows adequate changeover between the connection of the first element of the power distribution integration mechanism with the driveshaft and the connection of the second element of the power distribution integration mechanism with the driveshaft so as to improve the power transmission efficiency in the wider driving range. Here 'n' denotes a positive integral value of not lower than 1. The upper limit of 'n' is equal to the number of the multiple different speed change states settable in the speed change-transmission assembly.

The predetermined restriction may define a relationship between operation points for efficiently operating the internal combustion engine and the power demand, and the power output apparatus may further include an operation point setting module configured to set the operation point of the internal combustion engine based on the set power demand and the predetermined restriction when the required speed ratio is more than the lower limit speed ratio during the n-th speed of the speed change-transmission assembly. Thus, it is possible to ensure the efficient operation of the internal combustion engine and improve the fuel consumption until the required speed ratio becomes equal to or less than the lower limit speed ratio during the n-th speed state of the speed change-transmission assembly.

The operation point setting module may set a target rotational speed of the internal combustion engine to make the rotational speed of the engine shaft equal to the shift rotational speed and subsequently sets a target torque of the internal combustion engine in accordance with the set target rotational speed and a required power based on the set power demand so as to ensure output of the required power from the internal combustion engine during the engine rotational speed adjustment. Thus, it is possible to effectively prevent a variation in output power of the internal combustion engine during the engine rotational speed adjustment.

The lower limit speed ratio may be defined to prevent a value of power transmission efficiency between the internal combustion engine and the driveshaft from being lower than a value of the power transmission efficiency in the (n+1)-th speed state when the speed ratio between the engine shaft and the driveshaft becomes the lower limit speed ratio during the n-th speed state. Thus, it is possible to desirably keep the satisfactory power transmission efficiency between the internal combustion engine and the driveshaft during each of the different speed change states of the speed change-transmission assembly.

The lower limit speed ratio may be set based on the rotational speed of the engine shaft. The lower limit speed ratio may be set based on output power of the internal combustion engine. Thus, it is possible to ensure adequate setting of the lower limit speed ratio.

The lower limit speed ratio may be set with respect to each of the different speed change states of the speed change-transmission assembly. During each of the multiple different speed change states of the speed change-transmission assembly, keeping the currently active speed change state unchanged until the required speed ratio becomes equal to or less than the lower limit speed ratio further improves the power transmission efficiency between the internal combustion engine and the driveshaft.

The speed change controller may control the internal combustion engine, the first motor, and the second motor to make the speed ratio between the engine shaft and the driveshaft smaller than the lower limit speed ratio of the n-th speed state by a predetermined value and to ensure output of power equivalent to the set power demand to the driveshaft after the shift of the speed change state from the n-th speed state to the (n+1)-th speed state. After the shift of the speed change state from the n-th speed state to the (n+1)-th speed state, if setting the speed ratio between the engine shaft and the driveshaft equal to the lower limit speed ratio of the n-th speed state during the (n+1)-th speed state where a smaller value can be set as the speed ratio between the engine shaft and the driveshaft in comparison with the n-th speed state, the power transmission efficiency between the internal combustion engine and the driveshaft is undesirably decreased in comparison with a power transmission efficiency upon setting the speed ratio between the engine shaft and the driveshaft to the lower limit speed ratio in the n-th speed state. This causes a decrease of the driving force output to the driveshaft. Therefore, the power output apparatus controls the internal combustion engine, the first motor, and the second motor to make the speed ratio between the engine shaft and the driveshaft smaller than the lower limit speed ratio of the n-th speed state by the predetermined value after the shift of the speed change state from the n-th speed state to the (n+1)-th speed state. Thus, it is possible to effectively prevent the decrease of the driving force output to the driveshaft.

When the speed ratio between the engine shaft and the driveshaft becomes the predetermined shift speed ratio during the (n+1)-th speed state of the speed change-transmission assembly, the speed change-transmission assembly may shift the speed change state from the (n+1)-th speed state to the n-th speed state and set the speed ratio between the engine shaft and the driveshaft to a greater value. When the required speed ratio becomes equal to or more than the predetermined shift speed ratio during the (n+1)-th speed state of the speed change-transmission assembly, the speed change controller may control the internal combustion engine, the first motor, the second motor, and the speed change-transmission assembly to ensure output of power equivalent to the set power demand to the driveshaft while performing an engine rotational speed adjustment of making the rotational speed of the engine shaft equal to the shift rotational speed and a shift of the speed change state from the (n+1)-th speed state to the n-th speed state. In response to an increase of the required speed ratio, the speed change state is shifted from the (n+1)-th speed state to the n-th speed state where a greater value can be set as the speed ratio between the engine shaft and the driveshaft in comparison with the (n+1)-th speed state. This effectively improves the power transmission efficiency between the internal combustion engine and the driveshaft.

The speed change-transmission assembly may be a parallel shaft-type transmission including a first speed change mechanism having at least one parallel shaft-type gear train capable of connecting one of the first element and the second element of the power distribution integration mechanism to the driveshaft, and a second speed change mechanism having at least one parallel shaft-type gear train capable of connecting the other of the first element and the second element with the driveshaft.

The speed change-transmission assembly may be a planetary gear-type transmission including a planetary gear mechanism capable of connecting one of the first element and the second element of the power distribution integration mechanism to the driveshaft, and a connection mechanism capable of connecting the other of the first element and the second element to the driveshaft. In this case, the connection mechanism may directly connect the other of the first element and the second element to the driveshaft. The connection mechanism may also connect the other of the first element and the second element to the driveshaft with a change of the speed ratio.

A hybrid vehicle according to the present invention is a hybrid vehicle equipped with drive wheels driven with power from a driveshaft. The hybrid vehicle includes: an internal combustion engine; a first motor constructed to input and output power; a second motor constructed to input and output power; an accumulator arranged to supply and receive electric power from each of the first motor and the second motor; a power distribution integration mechanism configured to have a first element connected to a rotating shaft of the first motor, a second element connected to a rotating shaft of the second motor, and a third element connected to an engine shaft of the internal combustion engine, the power distribution integration mechanism allowing mutually differential rotations of the three elements; a speed change-transmission assembly constructed to selectively connect, either the first element or the second element of the power distribution integration mechanism to the driveshaft and set a speed change state selected among multiple different speed change states, the speed change-transmission assembly configured to, when a speed ratio between the engine shaft and the driveshaft becomes a predetermined shift speed ratio in an n-th speed state where one of the first element and the second element is connected to the driveshaft, shift the speed change state from the n-th speed state to an (n+1)-th speed state where the other of the first element and the second element is connected to the driveshaft so as to set the speed ratio between the engine shaft and the driveshaft to a smaller value; a power demand setting module configured to set a power demand that is power required for the driveshaft; a required speed ratio setting module configured to set a required speed ratio that is a required value of the speed ratio between the engine shaft and the driveshaft, based on the set power demand and a predetermined restriction; and a speed change controller configured to, when the required speed ratio becomes equal to or less than a predetermined lower limit speed ratio that is not more than the predetermined shift speed ratio during the n-th speed state of the speed change-transmission assembly, control the internal combustion engine, the first motor, the second motor, and the speed change-transmission assembly so as to ensure output of power equivalent to the set power demand to the driveshaft while performing an engine rotational speed adjustment of making a rotational speed of the engine shaft equal to a shift rotational speed corresponding to the shift speed ratio and a shift of the speed change state from the n-th speed state to the (n+1)-th speed state.

In the hybrid vehicle, the power transmission efficiency can be improved in the wider driving range, thereby attaining both the satisfactory fuel consumption and the favorable driving performance.

A control method of a power output apparatus according to the present invention is a control method of a power output apparatus. The power output apparatus includes: a driveshaft; an internal combustion engine; a first motor constructed to input and output power; a second motor constructed to input and output power; an accumulator arranged to supply and receive electric power from each of the first motor and the second motor; a power distribution integration mechanism configured to have a first element connected to a rotating shaft of the first motor, a second element connected to a rotating shaft of the second motor, and a third element connected to an engine shaft of the internal combustion engine, the power distribution integration mechanism allowing mutually differential rotations of the three elements; and a speed change-transmission assembly constructed to selectively connect either the first element or the second element of the power distribution integration mechanism to the driveshaft and set a speed change state selected among multiple different speed change states, the speed change-transmission assembly configured to, when a speed ratio between the engine shaft and the driveshaft becomes a predetermined shift speed ratio in an n-th speed state where one of the first element and the second element is connected to the driveshaft, shift the speed change state from the n-th speed state to an (n+1)-th speed state where the other of the first element and the second element is connected to the driveshaft so as to set the speed ratio between the engine shaft and the driveshaft to a smaller value. The method includes the steps of:

(a) determining whether or not a required speed ratio is equal to or less than a predetermined lower limit speed ratio that is not more than the predetermined shift speed ratio during the n-th speed state of the speed change-transmission assembly, required speed ratio being set as a required value of the speed ratio between the engine shaft and the driveshaft based on a power demand required for the driveshaft and a predetermined restriction;

(b) making a rotational speed of the engine shaft equal to a shift rotational speed corresponding to the predetermined shift speed ratio when the step (a) determines that the required speed ratio is equal to or less than the predetermined lower limit speed ratio; and (c) controlling the speed change-transmission assembly to shift the speed change state from the n-th speed state to the (n+1)-th speed state when the rotational speed of the engine shaft becomes the shift rotational speed.

The control method of the power output apparatus according allows adequate changeover between the connection of the first element of the power distribution integration mechanism with the driveshaft and the connection of the second element of the power distribution integration mechanism with the driveshaft so at to improve the power transmission efficiency in the wider driving range.

The internal combustion engine, the first motor, and the second motor may be controlled so as to ensure output of power equivalent to the power demand to the driveshaft during execution of the step (b) and the step (c).

BEST MODES OF CARRYING OUT THE INVENTION

One mode of carrying out the invention is described below as a preferred embodiment.

Figure 1:
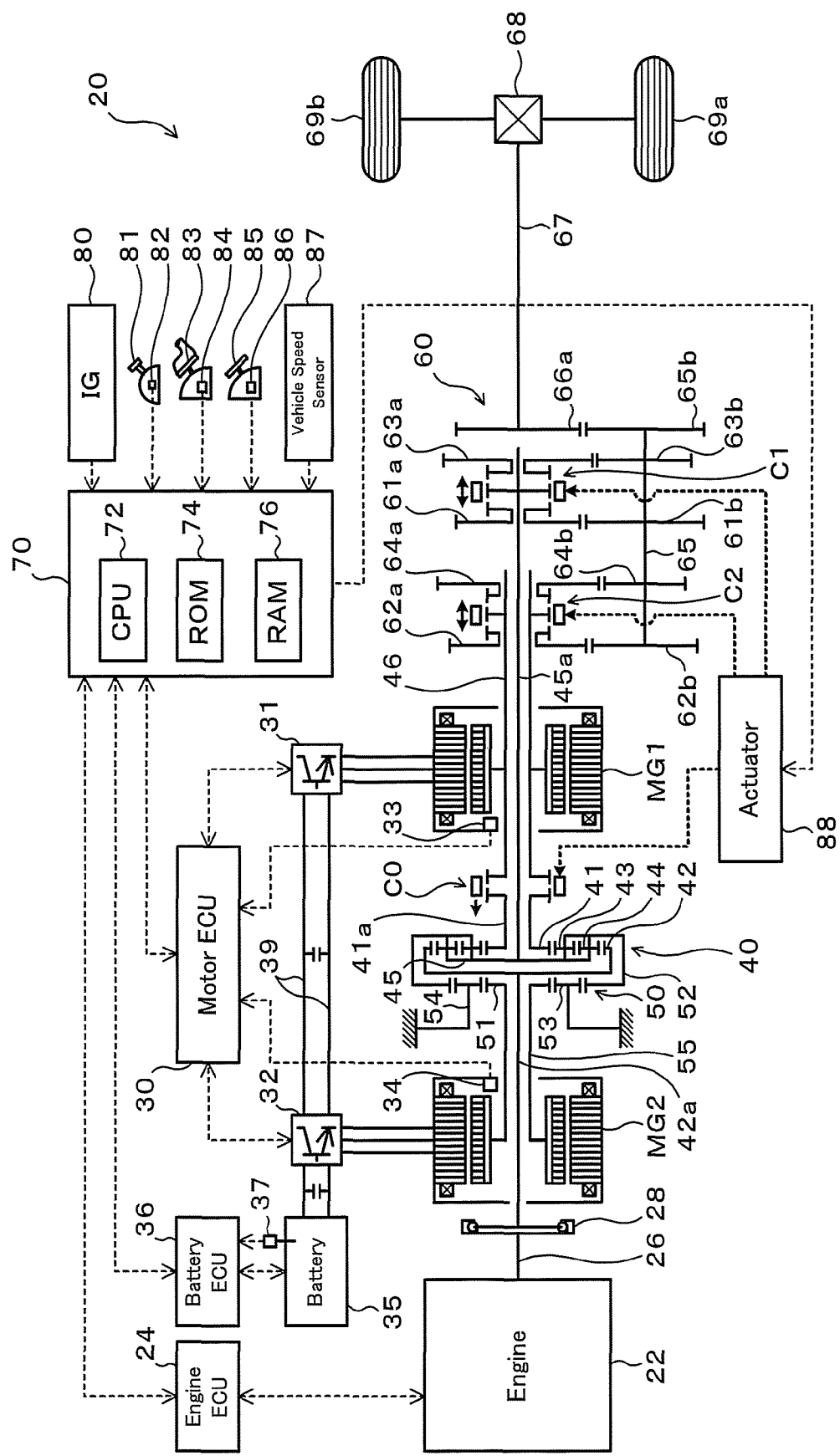
FIG. 1 a schematic block diagram of a hybrid vehicle 20 according to an embodiment of the present invention.

FIG. 1 schematically illustrates the configuration of a hybrid vehicle 20 in one embodiment of the invention. The hybrid vehicle 20 shown in FIG. 1 is constructed as a rear-wheel drive vehicle and includes an engine 22 located in a front portion of the vehicle, a power distribution integration mechanism 40 connected with a crankshaft (an engine shaft) 26 of the engine 22, a motor MG1 connected with the power distribution integration mechanism 40 and designed to have power generation capability, a motor MG2 arranged coaxially with the motor MG1 to be connected with the power distribution integration mechanism 40 via a reduction gear mechanism 50 and designed to have power generation capability, a transmission 60 constructed to transmit the output power of the power distribution integration mechanism 40 with a speed change to a driveshaft 67, and a hybrid electronic control unit 70 (hereafter referred to as 'hybrid ECU') configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereafter referred to as engine ECU). The engine ECU 24 inputs diverse signals from various sensors, for example, a crank position sensor (not shown) attached to the crankshaft 26, provided for the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The motors MG1 and MG2 are constructed as synchronous motor generators having same specifications to enable operations as both a generator and a motor. The motors MG1 and MG2 are arranged to supply and receive electric power from a battery 35 or an accumulator via inverters 31 and 32. Power lines 39 connecting the battery 35 with the inverters 31 and 32 are structured as common positive bus and negative bus shared by the inverters 31 and 32. Such connection enables electric power generated by one of the motors MG1 and MG2 to be consumed by the other motor MG2 or MG1. The battery 35 may thus be charged with surplus electric power generated by either of the motors MG1 and MG2 and be discharged to supplement insufficient electric power. The battery 35 is neither charged nor discharged upon the balance of the input and output of electric powers between the motors MG1 and MG2. Both the motors MG1 and MG2 are driven and controlled by a motor electronic control unit 30 (hereafter referred to as motor ECU). The motor ECU 30 inputs various signals required for driving and controlling the motors MG1 and MG2, for example, signals representing rotational positions of rotors in the motors MG1 and MG2 from rotational position detection sensors 33 and 34 and signals representing phase currents to be applied to the motors MG1 and MG2 from current sensors (not shown). The motor ECU 30 outputs switching control signals to the inverters 31 and 32. The motor ECU 30 also computes rotational speeds Nm1 and Nm2 of the rotors in the motors MG1 and MG2 according to a rotational speed computation routine (not shown) based on the input signals from the rotational position detection sensors 33 and 34. The motor ECU 30 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 35 is under control and management of a battery electronic control unit 36 (hereafter referred to as battery ECU). The battery ECU 36 inputs signals required for management and control of the battery 35, for example, an inter-terminal voltage from a voltage sensor (not shown) located between terminals of the battery 35, a charge-discharge current from a current sensor (not shown) located in the power line 39 connecting with the output terminal of the battery 35, and a battery temperature Tb from a temperature sensor 37 attached to the battery 35. The battery ECU 36 outputs data regarding the operating conditions of the battery 35 by communication to the hybrid ECU 70 and to the engine ECU 24 according to the requirements. For the purpose of control and management of the battery 35, the battery ECU 36 also performs an arithmetic operation of calculating a remaining charge or state of charge SOC of the battery 35 from an integrated value of the charge-discharge current.

The power distribution integration mechanism 40 is located, together with the motors MG1 and MG2, the reduction gear mechanism 50, and the transmission 60, in a transmission casing (not shown) and is arranged coaxially with the crankshaft 26 across a predetermined distance from the engine 22. The power distribution integration mechanism 40 of this embodiment is constructed as a double-pinion planetary gear mechanism including a sun gear 41 as an external gear, a ring gear 42 as an internal gear arranged concentrically with the sun gear 41, and a carrier 45 arranged to hold at least one set of two pinion gears 43 and 44 in such a manner as to allow both their revolutions and their rotations on their axes. The two pinion gears 43 and 44 engage with each other and are arranged to respectively engage with the sun gear 41 and engage with the ring gear 42. The power distribution integration mechanism 40 has the sun gear 41 (second element), the ring gear 42 (third element), and the carrier 45 (first element) as elements of differential rotation. In this embodiment, the power distribution integration mechanism 40 is constructed to have a gear ratio ρ (ratio of the number of teeth of the sun gear 41 to the number of teeth of the ring gear 42) satisfying a relation of ρ<0.5. The sun gear 41 as the second element of the power distribution integration mechanism 40 is connected with the motor MG1 (hollow rotor) or a second motor via a hollow sun gear shaft 41a extended from the sun gear 41 in an opposite direction to the engine 22 and a hollow first motor shaft 46 extended in the same direction (that is, toward a rear end of the vehicle). The carrier 45 as the first element is connected with the motor MG2 (hollow rotor) or a first motor via the reduction gear mechanism 50 located between the power distribution integration mechanism 40 and the engine 22 and a hollow second motor shaft 55 extended from the reduction gear mechanism 50 (a sun gear 51) toward the engine 22. The ring gear 42 as the third element is connected with the crankshaft 26 of the engine 22 via a ring gear shaft 42a extended to pass through the hollow second motor shaft 55 and the motor MG2 and a damper 28.

As shown in FIG. 1, a clutch C0 (connecting-disconnecting device) is provided between the sun gear shaft 41a and the first motor shaft 46 to make connection of the sun gear shaft 41a with the first motor shaft 46 (driving source element connection) and release of the connection. In the embodiment, the clutch C0 is structured, for example, as a dog clutch to make a dog element fastened to an end of the sun gear shaft 41a engage with a dog element fastened to an end of the first motor shaft 46 with lower loss and to release the engagement. The clutch C0 is actuated by an electric, electromagnetic, or hydraulic actuator 88. Releasing the clutch C0 disconnects the sun gear shaft 41a from the first motor shaft 46 and thereby separates the motor MG1 or the second motor from the sun gear 41 as the second element of the power distribution integration mechanism 40. The function of the power distribution integration mechanism 40 substantially separates the engine 22 from the motors MG1 and MG2 and the transmission 60. The first motor shaft 46 connectable with the sung gear 41 of the power distribution integration mechanism 40 by means of the clutch C0 is further extended from the motor MG1 in the opposite direction to the engine 22 (that is, toward the rear end of the vehicle) and is connected to the transmission 60. A carrier shaft (connecting shaft) 45a is extended from the carrier 45 of the power distribution integration mechanism 40 in the opposite direction to the engine 22 (that is, toward the rear end of the vehicle) to pass through the hollow sun gear shaft 41a and the hollow first motor shaft 46 and is also connected to the transmission 60. In the structure of the embodiment, the power distribution integration mechanism 40 is located between the coaxial motors MG1 and MG2 and is arranged coaxially with both the motors MG1 and MG2. The engine 22 is arranged coaxially with the motor MG2 and is located opposite to the transmission 60 across the power distribution integration mechanism 40. Namely the engine 22, the motors MG1 and MG2, the power distribution integration mechanism 40, and the transmission 60 as the constituents of the power output apparatus in the embodiment are arranged in the sequence of the engine 22, the motor MG2, (the reduction gear mechanism 50), the power distribution integration mechanism 40, the motor MG1, and the transmission 60 in a direction from the front end toward the rear end of the vehicle. This arrangement allows size reduction of the power output apparatus to be specifically suitable for being mounted on the hybrid vehicle 20 of the rear-wheel drive-based system.

The reduction gear mechanism 50 is constructed as a single-pinion planetary gear mechanism including a sun gear 51 as an external gear, a ring gear 52 as an internal gear arranged concentrically with the sun gear 51, multiple pinion gears 53 arranged to engage with both the sun gear 51 and the ring gear 52, and a carrier 54 arranged to hold the multiple pinion gears 53 in such a manner as to allow both their revolutions and their rotations on their axes. The sun gear 51 of the reduction gear mechanism 50 is connected to the rotor of the motor MG2 via the second motor shaft 55. The ring gear 52 of the reduction gear mechanism 50 is fixed to the carrier 45 of the power distribution integration mechanism 40, so that the reduction gear mechanism 50 is substantially integrated with the power distribution integration mechanism 40. The carrier 54 of the reduction gear mechanism 50 is fastened to the transmission casing. The function of the reduction gear mechanism 50 reduces the speed of the power from the motor MG2 and transmits the power of the reduced speed to the carrier 45 of the power distribution integration mechanism 40, while increasing the speed of the power from the carrier 45 and transmitting the power of the increased speed to the motor MG2. In the application of the power distribution integration mechanism 40 constructed as the double-pinion planetary gear mechanism to have the gear ratio ρ of lower than the value 0.5, the carrier 45 has a higher torque distribution rate from the engine 22 than that of the sun gear 41. The arrangement of the reduction gear mechanism 50 between the carrier 45 of the power distribution integration mechanism 40 and the motor MG2 desirably attains size reduction of the motor MG2 and lowers the power loss of the motor MG2. In the structure of the embodiment, the reduction gear mechanism 50 is located between the motor MG2 and the power distribution integration mechanism 40 and is integrated with the power distribution integration mechanism 40. This arrangement allows the further size reduction of the power output apparatus. In this embodiment, the reduction gear mechanism 50 is constructed to have a speed reduction ratio (ratio of the number of teeth of the sun gear 51 to the number of teeth of the ring gear 52) close to $\rho/(1-\rho)$, where $\rho$ represents the gear ratio of the power distribution integration mechanism 40. This arrangement enables the motors MG1 and MG2 to have the same specification, thus improving the productivities of the power output apparatus and the hybrid vehicle 20 and attaining the cost reduction.

The transmission 60 is constructed as a parallel shaft-type automatic transmission having a speed change state (speed ratio) selectively changeable among multiple different values. The transmission 60 includes a first counter drive gear 61a and a first counter driven gear 61b constituting a first speed gear train, a second counter drive gear 62a and a second counter driven gear 62b constituting a second speed gear train, a third counter drive gear 63a and a third counter driven gear 63b constituting a third speed gear train, a fourth counter drive gear 64a and a fourth counter driven gear 64b constituting a fourth speed gear train, a countershaft 65 with the respective counter driven gears 61b through 64b and a gear 65b fixed thereon, clutches C1 and C2, a gear 66a attached to the driveshaft 67, and a reverse gear train (not shown). In the description below, the 'first speed gear train to fourth speed gear train' may be called 'speed gear train', and the 'counter drive gears' and the 'counter driven gears' may be simply called 'gears'. In the transmission 60 of the embodiment, a speed ratio G(1) has a largest value for the first speed gear train and decreases in the sequence of the second speed gear train, the third speed gear train, and the fourth speed gear train.

As shown in FIG. 1, the first gear 61a of the first speed gear train is fastened in a rotatable but axially unmovable manner on the carrier shaft 45a, which is extended from the carrier 45 as the first element of the power distribution integration mechanism 40, and continuously engages with the first gear 61b fixed on the countershaft 65. Similarly the third gear 63a of the third speed gear train is fastened in a rotatable but axially unmovable manner on the carrier shaft 45a and continuously engages with the third gear 61b fixed on the countershaft 65. In the structure of this embodiment, the clutch C1 is provided on the side of the carrier shaft 45a (on the side of the counter drive gears) to selectively fix one of the first gear 61a (first speed gear train) and the third gear 63a (third speed gear train) to the carrier shaft 45a and to release both the first gear 61a and the third gear 63a from the carrier shaft 45a and thereby make the first gear 61a and the third gear 63a rotatable relative to the carrier shaft 45a. The clutch C1 is structured, for example, as a dog clutch to make a dog element fastened on the carrier shaft 45a in a non-rotatable but axially movable manner engage with either one of a dog element fastened on the first gear 61a and a dog element fastened on the third gear 63a with lower loss and to release the engagement. The clutch C1 is actuated by the actuator 88. The gears 61a and 61b of the first speed gear train, the gears 63a and 63b of the third speed gear train, and the clutch C1 cooperatively work as a first speed change mechanism of the transmission 60. The second gear 62a of the second speed gear train is fastened in a rotatable but axially unmovable manner on the first motor shaft 46, which is connectable with the sun gear 41 as the second element of the power distribution integration mechanism 40 via the clutch C0, and continuously engages with the second gear 62b fixed on the countershaft 65. Similarly the fourth gear 64a of the fourth speed gear train is fastened in a rotatable but axially unmovable manner on the first motor shaft 46 and continuously engages with the fourth gear 64b fixed on the countershaft 65. In the structure of this embodiment, the clutch C2 is provided on the side of the first motor shaft 46 (on the side of the counter drive gears) to selectively fix one of the second gear 62a (second speed gear train) and the fourth gear 64a (fourth speed gear train) to the first motor shaft 46 and to release both the second gear 62a and the fourth gear 64a from the first motor shaft 46 and thereby make the second gear 62a and the fourth gear 64a rotatable relative to the first motor shaft 46. The clutch C2 is also structured, for example, as a dog clutch to make a dog element fastened on the first motor shaft 46 in a non-rotatable but axially movable manner engage with either one of a dog element fastened on the second gear 62a and a dog element fastened on the fourth gear 64a with lower loss and to release the engagement. The clutch C2 is also actuated by the actuator 88. The gears 62a and 62b of the second speed gear train, the gears 64a and 64b of the fourth speed gear train, and the clutch C2 cooperatively work as a second speed change mechanism of the transmission 60.

The power transmitted from either the carrier shaft 45a or the first motor shaft 46 to the countershaft 65 is transmitted to the driveshaft 67 via the gears 65b and 66a and is eventually output to rear wheels 69a and 69b as drive wheels via a differential gear 68. In the structure of the transmission 60 of the embodiment, the clutch C1 and the clutch C2 are respectively provided on the side of the carrier shaft 45a and on the side of the first motor shaft 46. This arrangement desirably reduces the potential loss in the fixation of the gears 61a to 64a to the carrier shaft 45a or to the first motor shaft 46 by means of the clutches C1 and C2. In the second speed change mechanism including the fourth speed gear train having an extremely small speed reduction ratio, the rotational speed of the gear 64a that idles prior to the fixation to the first motor shaft 46 by means of the clutch C2 becomes lower than the rotational speed of the mating gear 64b on the countershaft 65. Providing at least the clutch C2 on the side of the first motor shaft 46 allows the engagement of the dog element on the gear 64a with the dog element on the first motor shaft 46 with lower loss. The degree of such loss reduction partly depends upon the ratio of the numbers of teeth in the respective gear trains. In the first speed change mechanism including the first speed gear train having a large speed reduction ratio, the clutch C1 may be provided on the side of the countershaft 65.

In the transmission 60 having the construction discussed above, the fixation of either one of the first gear 61a (first speed gear train) and the third gear 63a (third speed gear train) to the carrier shaft 45a by means of the clutch C1, in combination with the release of the clutch C2, causes the power from the carrier shaft 45a to be transmitted to the driveshaft 67 via the first gear 61a (first speed gear train) or the third gear 63a (third speed gear train) and the countershaft 65. The fixation of either one of the second gear 62a (second speed gear train) and the fourth gear 64a (fourth speed gear train) to the first motor shaft 46 by means of the clutch C2, in combination with the coupling of the clutch C0 and the release of the clutch C1, causes the power from the first motor shaft 46 to be transmitted to the driveshaft 67 via the second gear 62a (second speed gear train) or the fourth gear 64a (fourth speed gear train) and the countershaft 65. In the description hereafter, the state of power transmission by the first speed gear train, the state of power transmission by the second speed gear train, the state of power transmission by the third speed gear train, and the state of power transmission by the fourth speed gear train are respectively referred to as 'first speed state ($1^{st}$ speed)', 'second speed state ($2^{nd}$ speed)', 'third speed state ($3^{rd}$ speed)', and 'fourth speed state ($4^{th}$ speed). In the structure of the transmission 60 of the embodiment, the clutch C1 and the clutch C2 are respectively provided on the side of the carrier shaft 45a and on the side of the first motor shaft 46. This arrangement desirably reduces the potential loss in the fixation of the gears 61a to 64a to the carrier shaft 45a or to the first motor shaft 46 by means of the clutches C1 and C2. In the second speed change mechanism including the fourth speed gear train having an extremely small speed reduction ratio, the rotational speed of the gear 64a that idles prior to the fixation to the first motor shaft 46 by means of the clutch C2 becomes lower than the rotational speed of the mating gear 64b on the countershaft 65. Providing at least the clutch C2 on the side of the first motor shaft 46 allows the engagement of the dog element on the gear 64a with the dog element on the first motor shaft 46 with lower loss. The degree of such loss reduction partly depends upon the ratio of the numbers of teeth in the respective gear trains. In the first speed change mechanism including the first speed gear train having a large speed reduction ratio, the clutch C1 may be provided on the side of the countershaft 65.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 87. The hybrid ECU 70 makes connection with the engine ECU 24, the motor ECU 30, and the battery ECU 36 via its communication port to transmit various control signals and data to and from the engine ECU 24, the motor ECU 30, and the battery ECU 36 as mentioned previously. The actuator 88 actuating the clutch C0 and the clutches C1 and C2 of the transmission 60 is also under control of the hybrid ECU 70.

The series of operations of the hybrid vehicle 20 constructed as discussed above are explained with reference to FIGS. 2 through 11. In the charts of FIGS. 2 through 11, an S-axis represents a rotational speed of the sun gear 41 in the power distribution integration mechanism 40 (equivalent to a rotational speed Nm1 of the motor MG1 or the first motor shaft 46). An R-axis represents a rotational speed of the ring gear in the power distribution integration mechanism 40 (equivalent to a rotational speed Ne of the engine 22). A C-axis represents a rotational speed of the carrier 45 in the power distribution integration mechanism 40 (equivalent to a rotational speed of the carrier shaft 45a and a rotational speed of the ring gear 52 in the reduction gear mechanism 50). A 61a-axis to a 64a-axis, a 65-axis, and a 67-axis respectively represent rotational speeds of the first gear 64a to the fourth gear 64a in the transmission 60, a rotational speed of the countershaft 65, and a rotational speed of the driveshaft 67.

Figure 2:
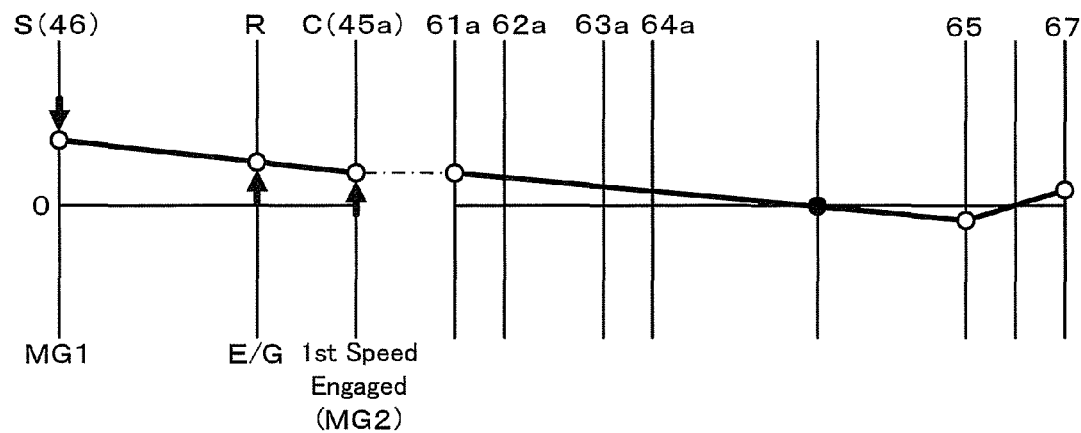
FIG. 2 is an explanatory view showing torque and rotational speeds of primary elements in a power distribution integration mechanism 40 and a transmission 60 when changing a speed change state of the transmission 60 in response to a variation in vehicle speed in a drive mode of the hybrid vehicle 20 of the embodiment with operation of an engine 22.
Figure 3:
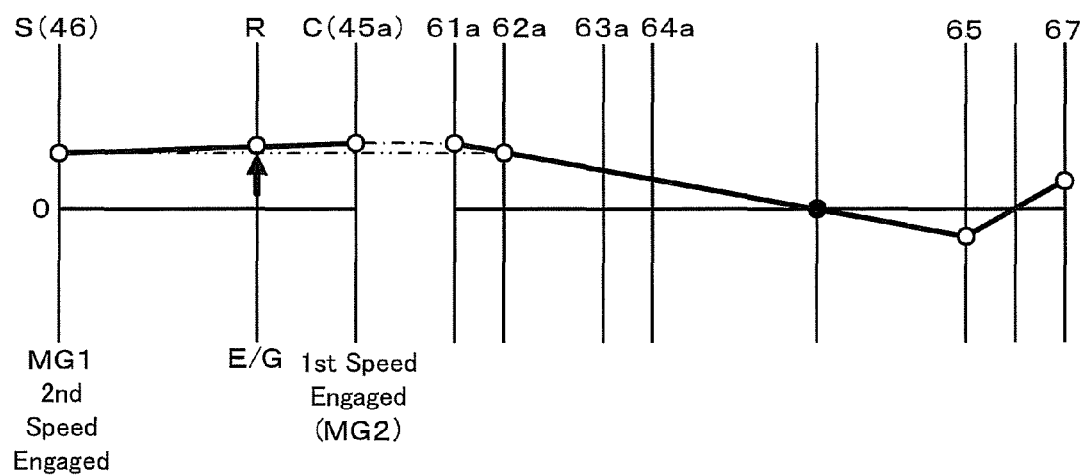
FIG. 3 is an explanatory view similar to FIG. 2.
Figure 4:
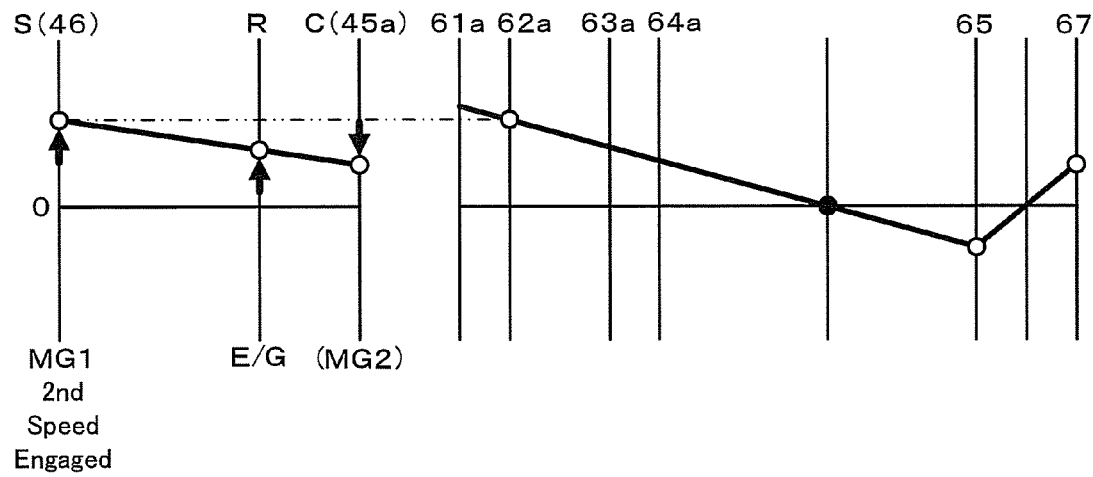
FIG. 4 is an explanatory view similar to FIG. 2.

During drive of the hybrid vehicle 20 with the operation of the engine 22 in the state of engagement of the clutch C0, the fixation of the first gear 61a (first speed gear train) to the carrier shaft 45a by means of the clutch C1 in combination with the release of the clutch C2 causes the power from the carrier shaft 45a to be subjected to speed change (speed reduction) at the speed ratio G(1) of the first speed gear train (first gears 61a and 61b) and to be output to the driveshaft 67 in the first speed state ($1^{st}$ speed) as shown in FIG. 2. In the first speed state, in response to a variation of the vehicle speed V, the synchronous rotation of the second gear 62a, which continuously engages with the second gear 62b fastened to the countershaft 65, with the first motor shaft 46 (sun gear 41) enables the second gear 62a (second speed gear train) to be fixed to the first motor shaft 46 by means of the clutch C2, while keeping the fixation of the first gear 61a (first speed gear train) to the carrier shaft 45a by means of the clutch C1 as shown in FIG. 3. In the description hereafter, the state of coupling the carrier 45 as the first element of the power distribution integration mechanism 40 to the driveshaft 67 by means of the first speed gear train of the transmission 60 and coupling the sun gear 41 as the second element of the power distribution integration mechanism 40 to the driveshaft 67 by means of the second speed gear train of the transmission 60 (that is, the state of FIG. 3) is referred to as '$1^{st}$ speed-$2^{nd}$ speed simultaneous engagement state'. The speed ratio between the crankshaft 26 of the engine 22 (ring gear 42) and the driveshaft 67 in the $1^{st}$ speed-$2^{nd}$ speed simultaneous engagement state is referred to as a first shift speed ratio γt(1). The first shift speed ratio γt(1) represents a speed ratio for a shift from the first speed state (first speed gear train) to an upper speed state. In the $1^{st}$ speed-$2^{nd}$ speed simultaneous engagement state, setting 0 to torque commands of both the motors MG1 and MG2 causes the power (torque) from the engine 22 not to be subjected to conversion into electrical energy but to be mechanically (directly) transmitted to the driveshaft 67 at the first shift speed ratio γt(1), which is a value between the gear ratio G(1) of the first speed gear train and a gear ratio G(2) of the second speed gear train. In the $1^{st}$ speed-$2^{nd}$ speed simultaneous engagement state shown in FIG. 3, the release of the clutch C1 keeps only the second gear 62a (second speed gear train) fixed to the first motor shaft 46 (sun gear 41) by means of the clutch C2 and causes the power from the first motor shaft 46 to be subjected to speed change at the gear ratio G(2) of the second speed gear train (second gears 62a and 62b) and to be output to the driveshaft 67 in the second speed state ($2^{nd}$ speed) as shown by a two-dot chain line in FIG. 4.

Figure 5:
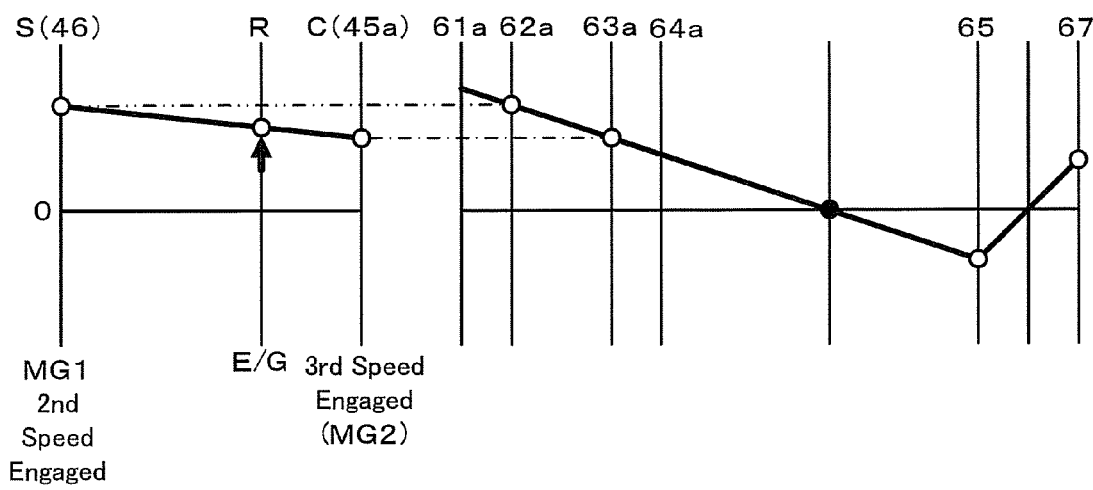
FIG. 5 is an explanatory view similar to FIG. 2.
Figure 6:
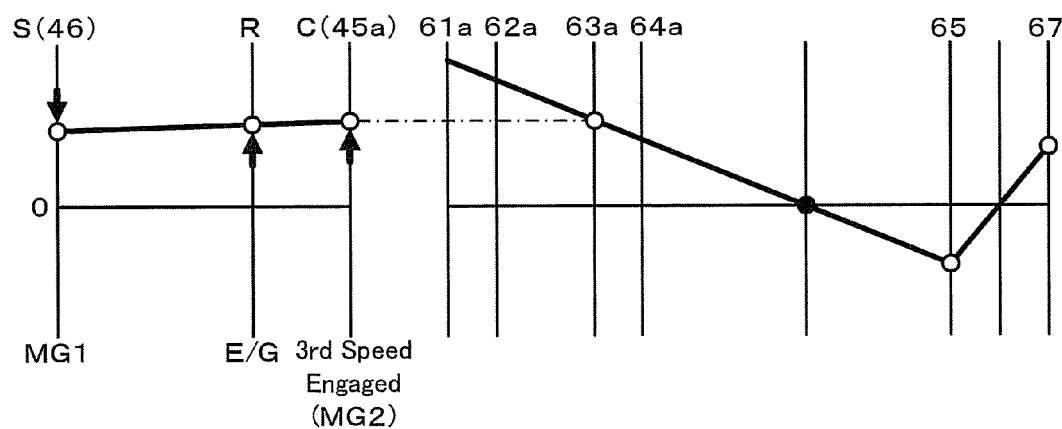
FIG. 6 is an explanatory view similar to FIG. 2.

In the second speed state, in response to a variation of the vehicle speed V, the synchronous rotation of the third gear 63a, which continuously engages with the third gear 63b fastened to the countershaft 65, with the carrier shaft 45a (carrier 45) enables the third gear 63a (third speed gear train) to be fixed to the carrier shaft 45a by means of the clutch C1, while keeping the fixation of the second gear 62a (second speed gear train) to the first motor shaft 46 by means of the clutch C2 as shown in FIG. 5. In the description hereafter, the state of coupling the sun gear 41 as the second element of the power distribution integration mechanism 40 to the driveshaft 67 by means of the second speed gear train of the transmission 60 and coupling the carrier 45 as the first element of the power distribution integration mechanism 40 to the driveshaft 67 by means of the third speed gear train of the transmission 60 (that is, the state of FIG. 5) is referred to as '$2^{nd}$ speed-$3^{rd}$ speed simultaneous engagement state'. The speed ratio between the crankshaft 26 of the engine 22 (ring gear 42) and the driveshaft 67 in the $2^{nd}$ speed-$3^{rd}$ speed simultaneous engagement state is referred to as a second shift speed ratio γt(2) in the second speed state (second speed gear train). In the $2^{nd}$ speed-$3^{rd}$ speed simultaneous engagement state, setting 0 to the torque commands of both the motors MG1 and MG2 causes the power (torque) from the engine 22 not to be subjected to conversion into electrical energy but to be mechanically (directly) transmitted to the driveshaft 67 at the second shift speed ratio γt(2), which is a value between the gear ratio G(2) of the second speed gear train and a gear ratio G(3) of the third speed gear train. In the $2^{nd}$ speed-$3^{rd}$ speed simultaneous engagement state shown in FIG. 5, the release of the clutch C2 keeps only the third gear 63a (third speed gear train) fixed to the carrier shaft 45a (carrier 45) by means of the clutch C1 and causes the power from the carrier shaft 45a to be subjected to speed change at the gear ratio G(3) of the third speed gear train (third gears 63a and 63b) and to be output to the driveshaft 67 in the third speed state ($3^{rd}$ speed) as shown by a one-dot chain line in FIG. 6.

Figure 7:
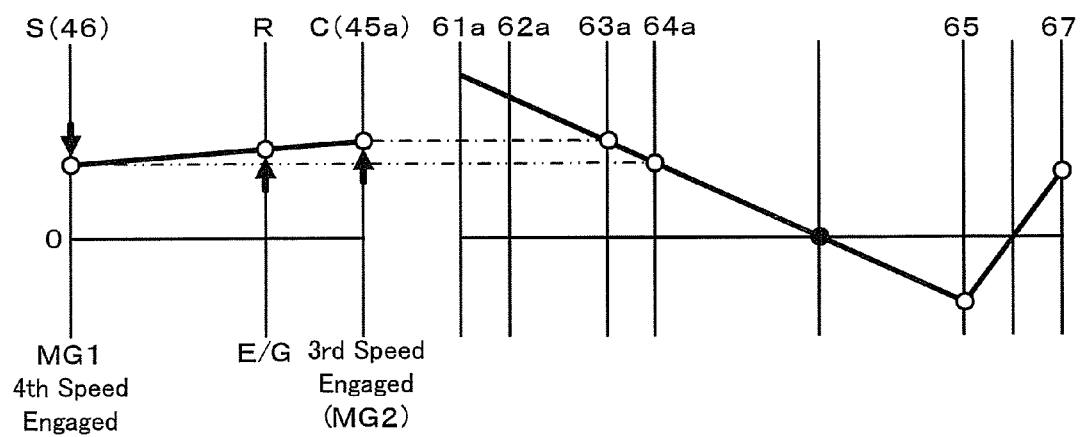
FIG. 7 is an explanatory view similar to FIG. 2.
Figure 8:
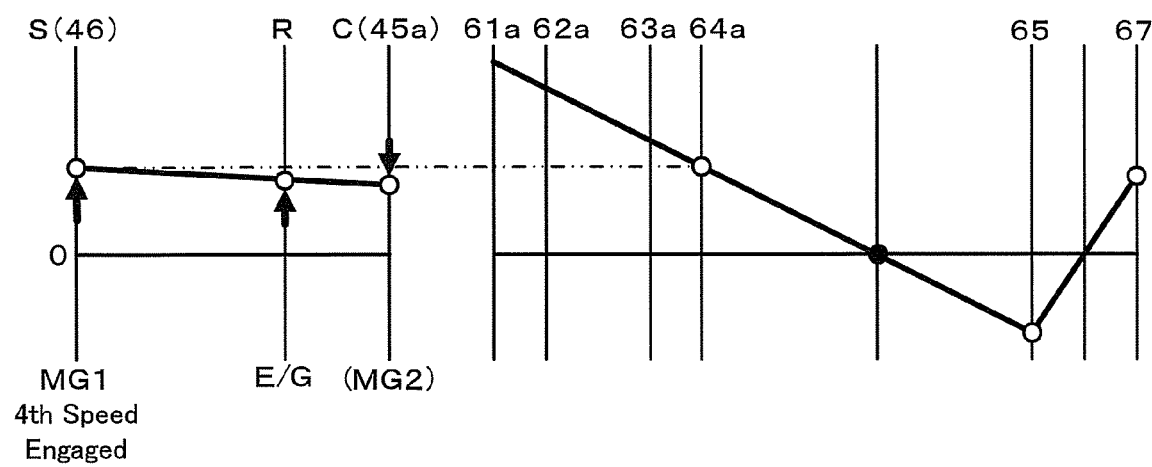
FIG. 8 is an explanatory view similar to FIG. 2.

In the third speed state, in response to a variation of the vehicle speed V, the synchronous rotation of the fourth gear 64a, which continuously engages with the fourth gear 64b fastened to the countershaft 65, with the first motor shaft 46 (sun gear 41) enables the fourth gear 64a (fourth speed gear train) to be fixed to the first motor shaft 46 by means of the clutch C2, while keeping the fixation of the third gear 63a (third speed gear train) to the carrier shaft 45a by means of the clutch C1 as shown in FIG. 7. In the description hereafter, the state of coupling the carrier 45 as the first element of the power distribution integration mechanism 40 to the driveshaft 67 by means of the third speed gear train of the transmission 60 and coupling the sun gear 41 as the second element of the power distribution integration mechanism 40 to the driveshaft 67 by means of the fourth speed gear train of the transmission 60 (that is, the state of FIG. 7) is referred to as '$3^{rd}$ speed-$4^{th}$ speed simultaneous engagement state'. The speed ratio between the crankshaft 26 of the engine 22 (ring gear 42) and the driveshaft 67 in the $3^{rd}$ speed-$4^{th}$ speed simultaneous engagement state is referred to as a third shift speed ratio γt(3) in the third speed state (third speed gear train). In the $3^{rd}$ speed-$4^{th}$ speed simultaneous engagement state, setting 0 to the torque commands of both the motors MG1 and MG2 causes the power (torque) from the engine 22 not to be subjected to conversion into electrical energy but to be mechanically (directly) transmitted to the driveshaft 67 at the third shift speed ratio γt(3), which is a value between the gear ratio G(3) of the third speed gear train and a gear ratio G(4) of the fourth speed gear train. In the $3^{rd}$ speed-$4^{th}$ speed simultaneous engagement state shown in FIG. 7, the release of the clutch C1 keeps only the fourth gear 64a (fourth speed gear train) fixed to the first motor shaft 46 (sun gear 41) by means of the clutch C2 and causes the power from the first motor shaft 46 to be subjected to speed change at the gear ratio G(4) of the fourth speed gear train (fourth gears 64a and 64b) and to be output to the driveshaft 67 in the fourth speed state ($4^{th}$ speed) as shown by a two-dot chain line in FIG. 8.

Figure 9:
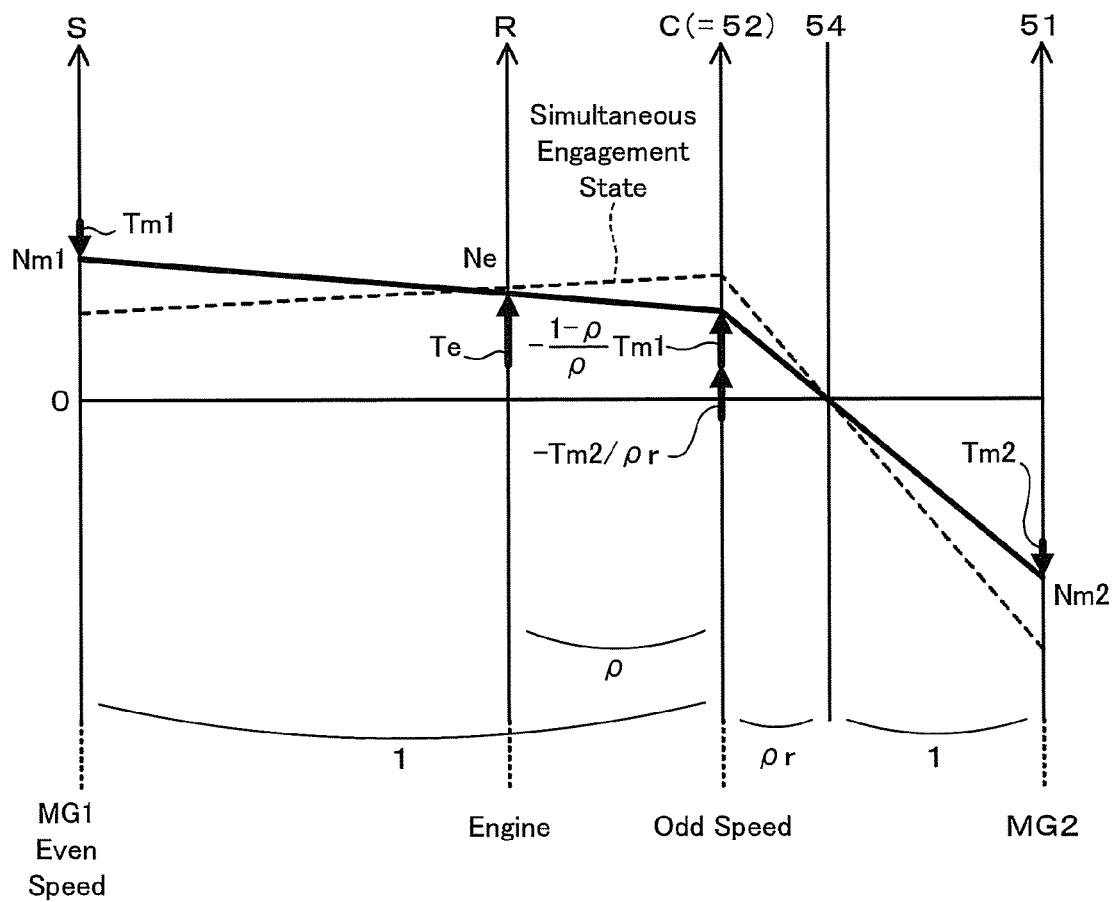
FIG. 9 is an alignment chart showing torque and rotational speed of the elements of the power distribution integration mechanism 40 and a reduction gear mechanism 50 when making a motor MG1 function as a generator and a motor MG2 function as a motor.

As discussed above, during drive of the hybrid vehicle 20 with the operation of the engine 22, in response to setting the transmission 60 in either the first speed state or the third speed state, the motors MG1 and MG2 are driven and controlled to specify the carrier 45 of the power distribution integration mechanism 40 as the output element and make the motor MG2 connecting with the carrier 45 function as a motor and to cause the motor MG1 connecting with the sun gear 41 specified as the reaction force element to function as a generator. In this state, the power distribution integration mechanism 40 distributes the power of the engine 22 input via the ring gear 42 into the sun gear 41 and the carrier 45 according to its gear ratio ρ, while integrating the power of the engine 22 with the power of the motor MG2 functioning as the motor and outputting the integrated power to the carrier 45. In the description hereafter, the mode of making the motor MG1 function as the generator and the motor MG2 function as the motor is referred to as 'first torque conversion mode'. In the first torque conversion mode, the power from the engine 22 is subjected to torque conversion by means of the power distribution integration mechanism 40 and the motors MG1 and MG2 and is output to the carrier 45. Controlling the rotational speed of the motor MG1 enables the ratio of the rotational speed Ne of the engine 22 to the rotational speed of the carrier 45 as the output element to be varied in a stepless and continuous manner. FIG. 9 is an alignment chart showing torque-rotational speed dynamics of the respective elements in the power distribution integration mechanism 40 and in the reduction gear mechanism 50 in the first torque conversion mode. In the alignment chart of FIG. 9, an S-axis, an R-axis, and a C-axis represent the same as those in the charts of FIGS. 2 through 8. A 54-axis represents a rotational speed of the carrier 54 in the reduction gear mechanism 50. A 51-axis represents a rotational speed of the sun gear 51 in the reduction gear mechanism 50 (that is equivalent to a rotational speed Nm2 of the motor MG2 or the second motor shaft 55). In FIG. 9, ρ and ρr respectively denote a gear ratio of the power distribution integration mechanism 40 (ratio of the number of teeth of the sun gear 41 to the number of teeth of the ring gear 42) and a speed reduction ratio of the reduction gear mechanism 50 (ratio of the number of teeth of the sun gear 51 to the number of teeth of the ring gear 52). Thick arrows on the respective axes show torques applied to the corresponding elements. In the alignment chart of FIG. 9, the rotational speeds on the S-axis, the R-axis, the C-axis, and the 51-axis have positive values above a 0-axis (horizontal axis) and negative values below the 0-axis. In the alignment chart of FIG. 9, each thick arrow represents torque applied to the corresponding element as mentioned above. Each upward arrow shows torque of a positive value, while each downward arrow shows torque of a negative value (these indications are also adopted in FIGS. 2 through 8, FIG. 10, and FIG. 11).

Figure 10:
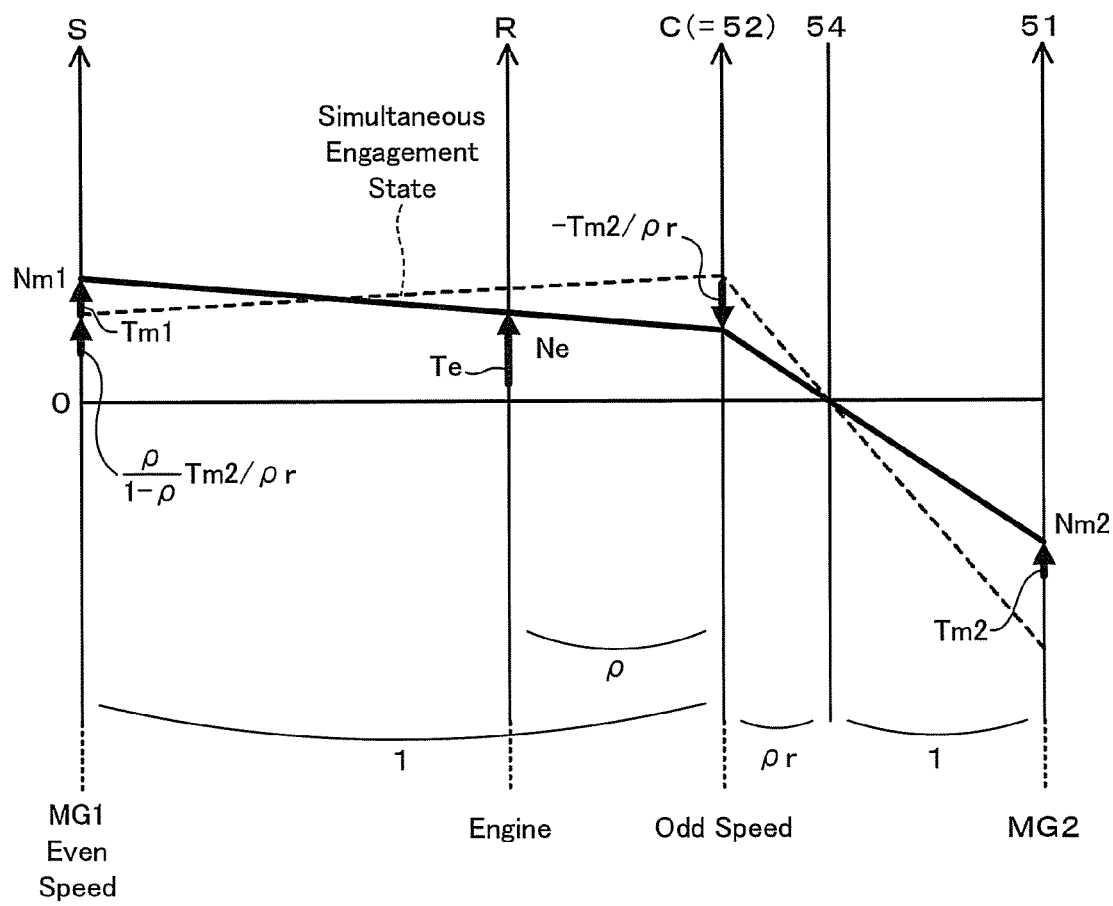
FIG. 10 is an alignment chart showing torque and rotational speed of the elements of the power distribution integration mechanism 40 and the reduction gear mechanism 50 when making the motor MG2 function as a generator and the motor MG1 function as a motor.

During drive of the hybrid vehicle 20 with the operation of the engine 22, in response to setting the transmission 60 in either the second speed state or the fourth speed state, the motors MG1 and MG2 are driven and controlled to specify the sun gear 41 of the power distribution integration mechanism 40 as the output element and make the motor MG1 connecting with the sun gear 41 function as a motor and to cause the motor MG2 connecting with the carrier 45 specified as the reaction force element to function as a generator. In this state, the power distribution integration mechanism 40 distributes the power of the engine 22 input via the ring gear 42 into the sun gear 41 and the carrier 45 according to its gear ratio ρ, while integrating the power of the engine 22 with the power of the motor MG1 functioning as the motor and outputting the integrated power to the sun gear 41. In the description hereafter, the mode of making the motor MG2 function as the generator and the motor MG1 function as the motor is referred to as 'second torque conversion mode'. In the second torque conversion mode, the power from the engine 22 is subjected to torque conversion by means of the power distribution integration mechanism 40 and the motors MG1 and MG2 and is output to the sun gear 41. Controlling the rotational speed of the motor MG2 enables the ratio of the rotational speed Ne of the engine 22 to the rotational speed of the carrier 41 as the output element to be varied in a stepless and continuous manner. FIG. 10 is an alignment chart showing torque-rotational speed dynamics of the respective elements in the power distribution integration mechanism 40 and in the reduction gear mechanism 50 in the second torque conversion mode.

As described above, in the hybrid vehicle 20 of the embodiment, the torque conversion mode is alternately changed over between the first torque conversion mode and the second torque conversion mode with a change of the speed change state (speed ratio) of the transmission 60. Such alternate change of the torque conversion mode desirably prevents the rotational speed Nm1 or Nm2 of one motor MG1 or MG2 functioning as a generator from decreasing to a negative value with an increase of the rotational speed Nm2 or Nm1 of the other motor MG2 or MG1 functioning as a motor. The configuration of the hybrid vehicle 20 thus effectively prevents the occurrence of power circulation in the first torque conversion mode as well as the occurrence of power circulation in the second torque conversion mode, thus improving the power transmission efficiency in a wider driving range. The power circulation in the first torque conversion mode is that, in response to a decrease of the rotational speed of the motor MG1 to a negative value, the motor MG2 consumes part of the power output to the carrier shaft 45a to generate electric power, while the motor MG1 consumes the electric power generated by the motor MG2 to output power. The power circulation in the second torque conversion mode is that, in response to a decrease of the rotational speed of the motor MG2 to a negative value, the motor MG1 consumes part of the power output to the first motor shaft 46 to generate electric power, while the motor MG2 consumes the electric power generated by the motor MG1 to output power. Prevention of such power circulation restricts the maximum rotational speeds of the motors MG1 and MG2 and thus desirably allows size reduction of the motors MG1 and MG2. In the hybrid vehicle 20 of the embodiment, the power from the engine 22 is mechanically (directly) transmittable to the driveshaft 67 at the specific speed ratios respectively intrinsic to the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state as explained previously. This arrangement desirably increases the opportunity of mechanically outputting the power from the engine 22 to the driveshaft 67 without conversion into electrical energy, thus further improving the power transmission efficiency in the wider driving range. In general, in the power output apparatus having the engine, the two motors, and the differential rotation mechanism, such as the planetary gear mechanism, there is a greater fraction of conversion of the engine output power into electrical energy at a relatively large speed reduction ratio between the engine and the driveshaft. This lowers the power transmission efficiency and tends to cause heat evolution from the motors MG1 and MG2. The simultaneous engagement modes discussed above are thus especially advantageous for the relatively large speed reduction ratio between the engine 22 and the driveshaft.

Figure 11:
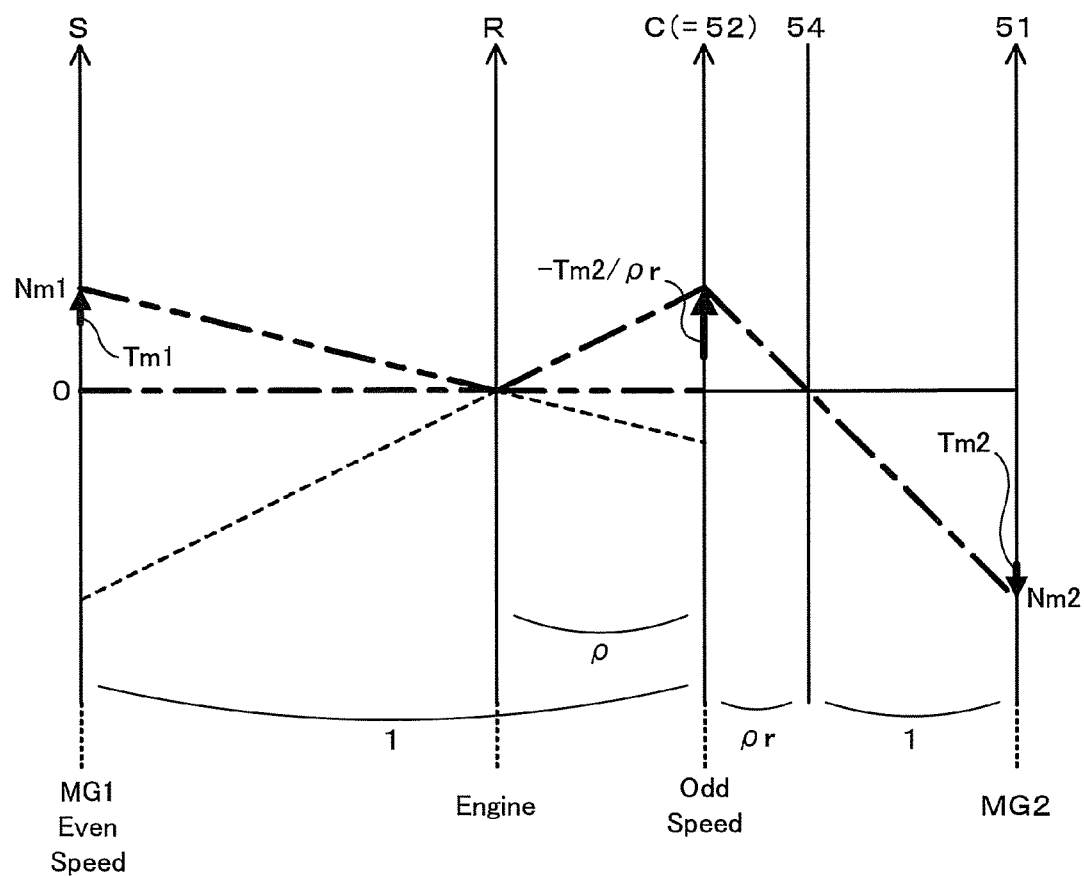
FIG. 11 is an explanatory view for describing a motor drive mode in the hybrid vehicle 20 of the embodiment.

The following describes the outline of the motor drive mode, where the engine 22 stops its operation and at least one of the motors MG1 and MG2 consumes the electric power supplied from the battery 35 and outputs the driving power to drive the hybrid vehicle 20, with reference to FIG. 11 and other relevant drawings. The motor drive mode in the hybrid vehicle 20 of the embodiment mainly has three different modes, a clutch-engaged 1-motor drive mode, a clutch-released 1-motor drive mode, and a 2-motor drive mode. In the clutch-engaged 1-motor drive mode with engagement of the clutch C0, either the first gear 61a of the first speed gear train or the third gear 63a of the third speed gear train in the transmission 60 is fixed to the carrier shaft 45a to make only the motor MG2 output power. Alternatively either the second gear 62a of the second speed gear train or the fourth gear 64a of the fourth speed gear train in the transmission 60 is fixed to the first motor shaft 46 to make only the motor MG1 output power. In this clutch-engaged 1-motor drive mode, the engagement of the clutch C0 connects the sun gear 41 of the power distribution integration mechanism 40 with the first motor shaft 46. Such connection causes one motor MG1 or MG2 that does not output the driving power to be followed up and idled by the other motor MG2 or MG1 that outputs the driving power (as shown by a broken line in FIG. 11). In the clutch-released 1-motor drive mode with release of the clutch C0, either the first gear 61a of the first speed gear train or the third gear 63a of the third speed gear train in the transmission 60 is fixed to the carrier shaft 45a to make only the motor MG2 output power. Alternatively either the second gear 62a of the second speed gear train or the fourth gear 64a of the fourth speed gear train in the transmission 60 is fixed to the first motor shaft 46 to make only the motor MG1 output power. In this clutch-released 1-motor drive mode, the release of the clutch C0 disconnects the sun gear 41 from the first motor shaft 46. Such disconnection prevents the follow-up of the crankshaft 26 of the engine 22, which is at stop by the function of the power distribution integration mechanism 40, while preventing the follow-up of the motor MG1 or MG2, which is at stop by the release of the clutch C2 or C1, as shown by a one-dot chain line and a two-dot chain line in FIG. 11. This arrangement desirably prevents a decrease of the power transmission efficiency. In the 2-motor drive mode with release of the clutch C0, at least one of the motors MG1 and MG2 is driven and controlled after setting the transmission 60 in one of the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state by the functions of the clutches C1 and C2. Such drive control enables both the motors MG1 and MG2 to output the driving power, while effectively preventing the follow-up of the engine 22. This arrangement allows transmission of large power to the driveshaft 67 in the motor drive mode, thus ensuring a good hill start and the favorable towing performance in the motor drive mode.

In selection of the clutch-released 1-motor drive mode, the hybrid vehicle 20 of the embodiment readily shifts the speed change state (speed ratio) of the transmission 60 to ensure efficient transmission of the power to the driveshaft 67. For example, in the clutch-released 1-motor drive mode, in the course of power output from only the motor MG2 by the fixation of the first gear 61a of the first speed gear train or the third gear 63a of the third speed gear train in the transmission 60 to the carrier shaft 45a, synchronization of the rotational speed of the motor MG1, which is at stop, with the rotational speed of either the second gear 62a of the second speed gear train or the fourth gear 64a of the fourth speed gear train in combination with fixation of either the second gear 62a or the fourth gear 64a to the first motor shaft 46 by means of the clutch C2 allows a shift of the drive mode to the 2-motor drive mode, that is, one of the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state. In this state, power output from only the motor MG1 in combination with release of the clutch C1 of the transmission 60 causes the output power of the motor MG1 to be transmitted to the driveshaft 67 via either the second speed gear train or the fourth speed gear train of the transmission 60. In the hybrid vehicle 20 of the embodiment, the transmission 60 is used to change the rotational speed of the carrier shaft 45a or of the first motor shaft 46 and amplify the torque in the motor drive mode. This arrangement desirably lowers the maximum torques required for the motors MG1 and MG2 and thus ensures size reduction of the motors MG1 and MG2. In the process of a change of the speed ratio of the transmission 60 during drive in the motor drive mode, the hybrid vehicle 20 of the embodiment transits the simultaneous engagement state of the transmission 60, that is, the 2-motor drive mode. This arrangement effectively prevents a torque-off condition at the time of a change of the speed ratio and ensures a smooth and shockless change of the speed ratio. In the motor drive mode, in response to an increase in driving force demand or in response to a decrease in state of charge SOC of the battery 35, the hybrid vehicle 20 of the embodiment controls one motor MG1 or MG2 that does not output the driving power to crank the engine 22 according to the speed ratio of the transmission 60 and thereby starts the engine 22.

Figure 12:
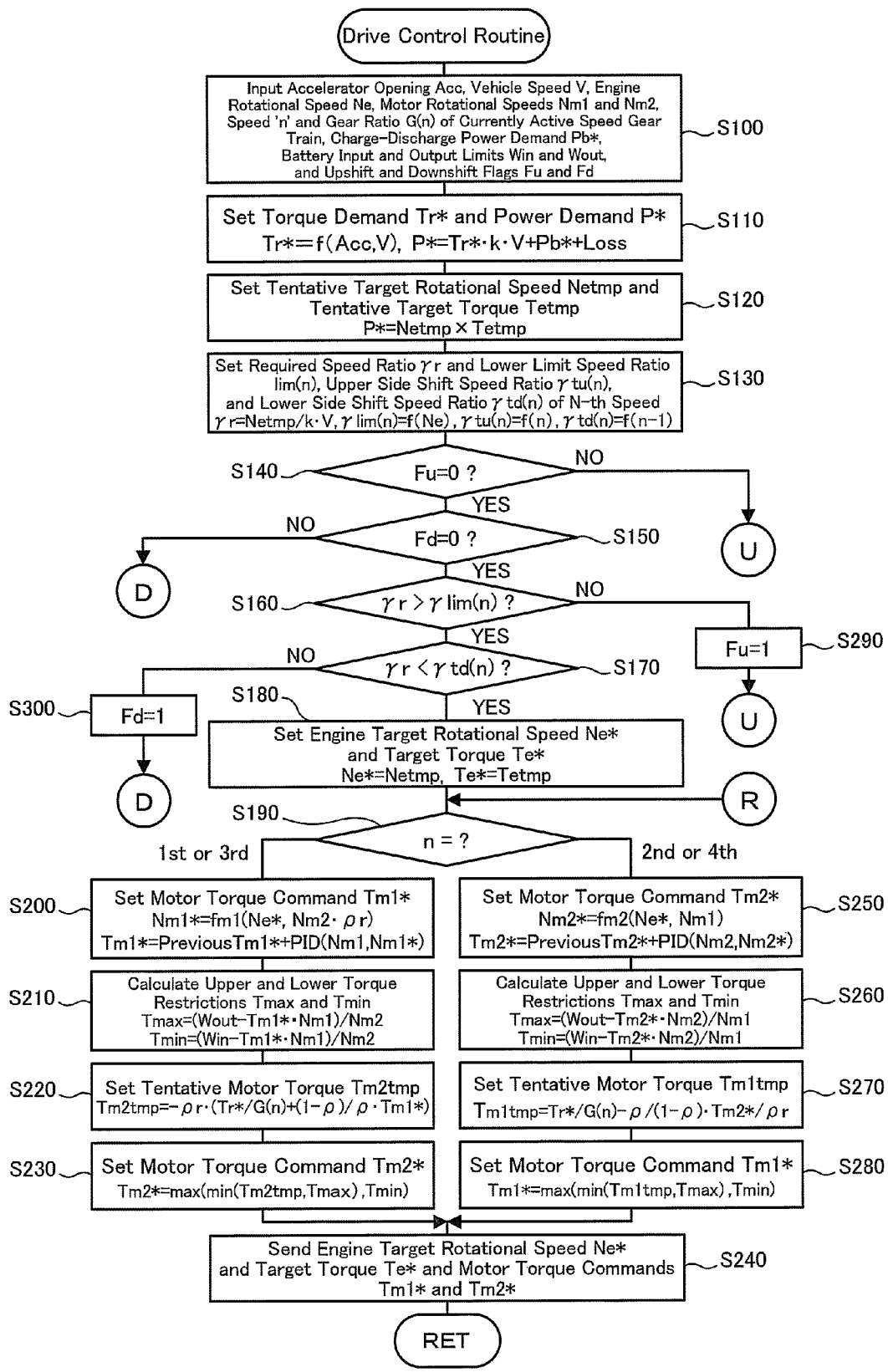
FIG. 12 is a flowchart showing a drive control routine performed by a hybrid ECU 70 during drive of the hybrid vehicle 20 of the embodiment with engagement of a clutch C0 and operation of the engine 22.
Figure 13:
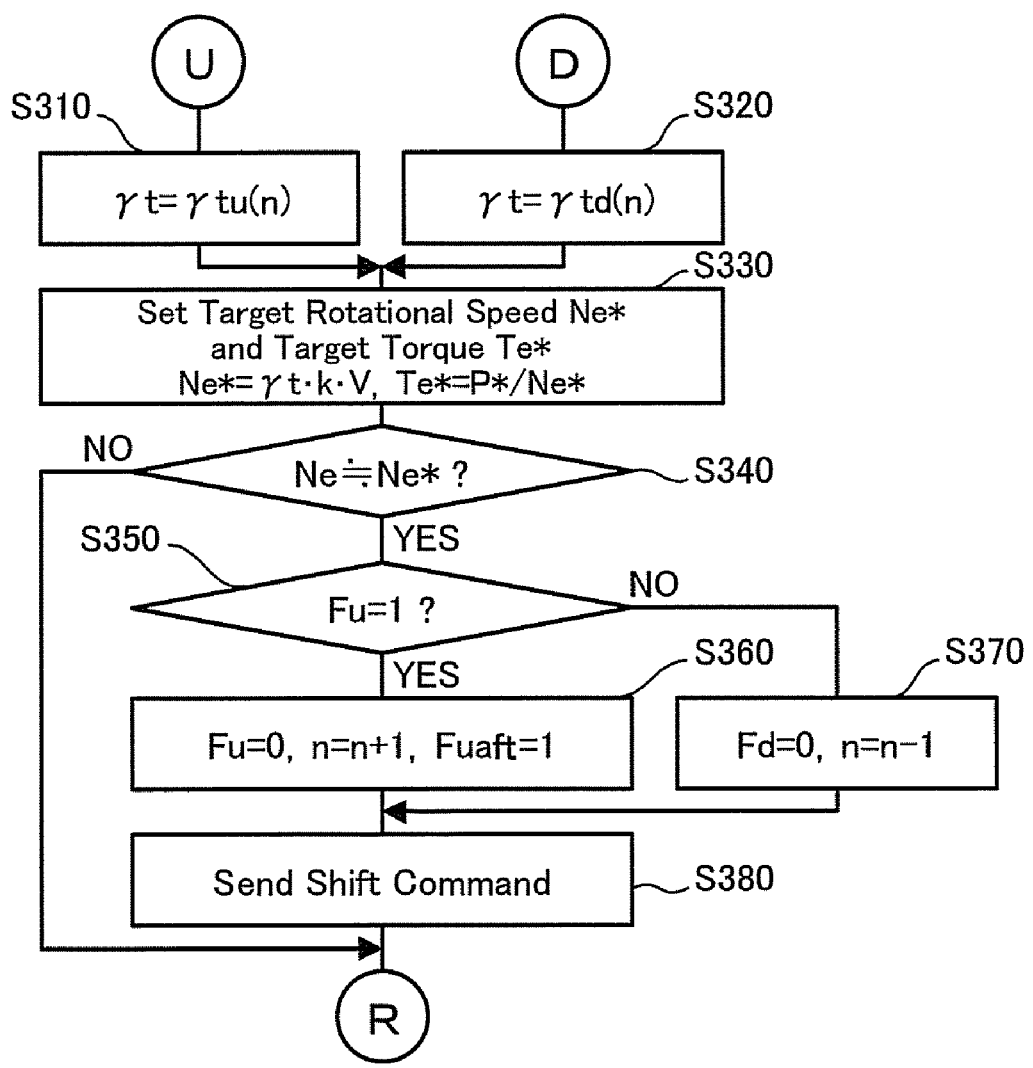
FIG. 13 is a flowchart showing the drive control routine performed by the hybrid ECU 70 during drive of the hybrid vehicle 20 of the embodiment with engagement of the clutch C0 and operation of the engine 22.

Series of operations to shift the speed change state (speed ratio) of the transmission 60 during drive of the hybrid vehicle 20 with the operation of the engine 22 are described below with reference to FIGS. 12 through 18. FIGS. 12 and 13 are flowcharts showing a drive control routine performed by the hybrid ECU 70 at predetermined time intervals (for example, at every several msec) during drive of the hybrid vehicle 20 with engagement of the clutch C0 and operation of the engine 22.

At the start of the drive control routine shown in FIGS. 12 and 13, the CPU 72 of the hybrid ECU 70 inputs various data required for control, for example, the accelerator opening Acc from the accelerator pedal position sensor 84, the vehicle speed V from the vehicle speed sensor 87, the rotational speed Ne of the engine 22 (crankshaft 26), the rotational speeds Nm1 and Nm2 of the motors MG1 and MG2, a current speed 'n' set by a currently active speed gear train of the transmission 60 (where n=1, 2, 3, 4 in the embodiment) and a corresponding gear ratio G(n), a charge-discharge power demand Pb*, input and output limits Win and Wout of the battery 35, an upshift flag Fu, and a downshift flag Fd (step S100). The rotational speed Ne of the engine 22 is computed on the basis of a signal from a crank position sensor (not shown) and is input from the engine ECU 24 by communication. The rotational speeds Nm1 and Nm2 of the motors MG1 and MG2 are input from the motor ECU 30 by communication. The current speed 'n' set by the currently active speed gear train is, for example, n=1 when the currently active speed gear train of the transmission 60 is the first speed gear train, and is n=2 when the currently active speed gear train of the transmission 60 is the second speed gear train. The currently active speed gear train represents one of the first speed gear train to the fourth speed gear train that is currently active to couple the carrier shaft 45a or the first motor shaft 46 with the driveshaft 67. The current speed 'n' set by the currently active speed gear train and the corresponding gear ratio G(n) are stored in a specific area of the RAM 76 on completion of the coupling of the carrier shaft 45a or the first motor shaft 46 with the driveshaft 67 via one of the first speed gear train to the fourth speed gear train. The charge-discharge power demand Pb* (having positive values at the time of discharge in the embodiment) represents electric power to be charged into or discharged from the battery 35. The charge-discharge power demand Pb* is set according to the state of charge SOC of the battery 35 by the battery ECU 36 and is input from the battery ECU 36 by communication. The input limit Win and the output limit Wout respectively represent an allowable charging electric power to be charged into the battery 35 and an allowable discharging electric power to be discharged from the battery 35. The input limit Win and the output limit Wout are set based on the battery temperature Tb of the battery 35 measured by the temperature sensor 37 and the state of charge SOC of the battery 35 and are input from the battery ECU 36 by communication. A concrete procedure of setting the input limit Win and the output limit Wout of the battery 35 sets base values of the input limit Win and the output limit Wout corresponding to the battery temperature Tb, sets an input limit correction coefficient and an output limit correction coefficient according to the state of charge (SOC) of the battery 35, and multiplies the base values of the input limit Win and the output limit Wout by the corresponding correction coefficients. The upshift flag Fu is set to 0 for no upshift change (n→n+1) of the speed change state (speed gear train) of the transmission 60 and is set to 1 for an upshift change of the speed change state of the transmission 60. The downshift flag Fd is set to 0 for no downshift change (n→n−1) of the speed change state of the transmission 60 and is set to 1 for a downshift change of the speed change state of the transmission 60.

Figure 14:
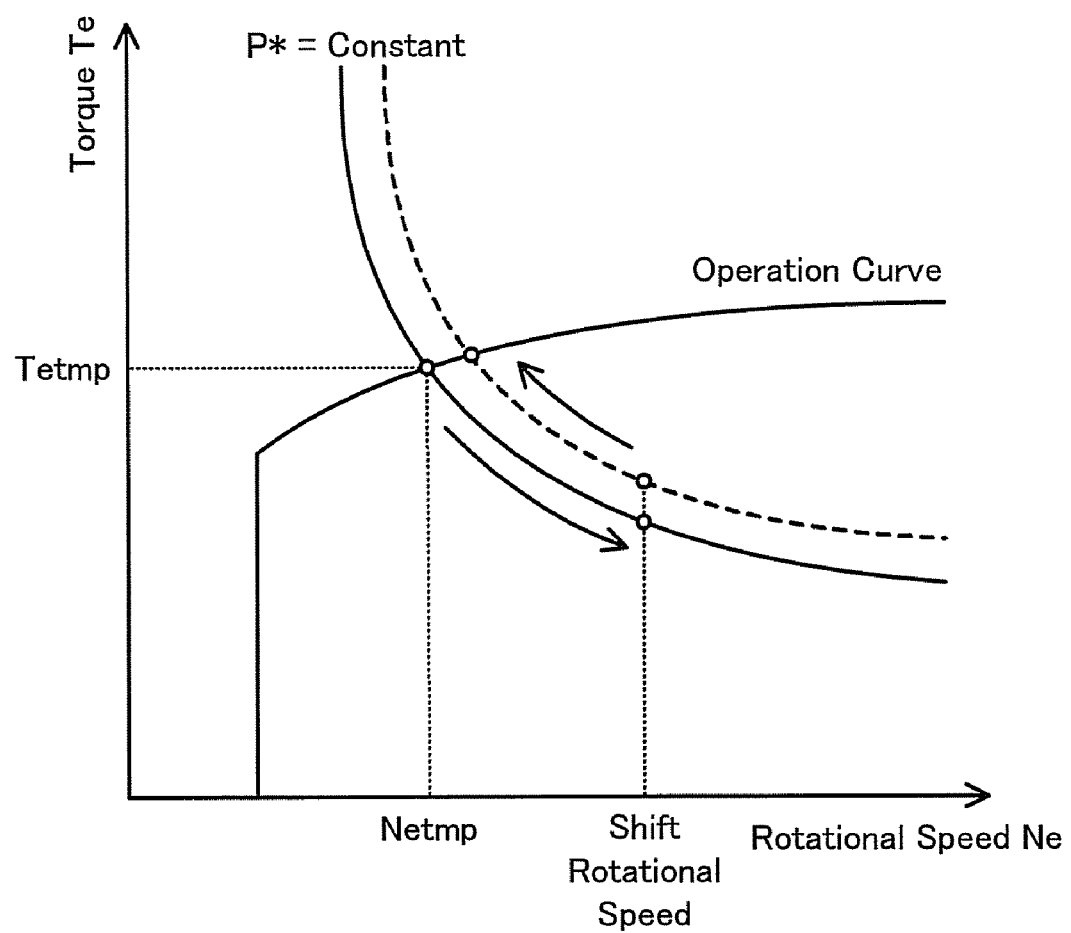
FIG. 14 shows an operation curve of the engine 22 and correlation curves (constant power curves) between an engine rotational speed Ne and an engine torque Te.

After the data input at step S100, the CPU 72 sets a torque demand Tr* to be output to the driveshaft 67 and a power demand P* required for the whole hybrid vehicle 20, based on the input accelerator opening Acc and the input vehicle speed V (step S110). A concrete procedure of the embodiment provides and stores in advance variations in torque demand Tr* against the vehicle speed V with respect to various settings of the accelerator opening Acc as a torque demand setting map (not shown) in the ROM 74 and derives and sets the torque demand Tr* corresponding to the given accelerator opening Acc and the given vehicle speed V from this torque demand setting map. The power demand P* is obtained as the sum of the product of the torque demand Tr* set at step S110 and the vehicle speed V, which reflects the rotational speed of the driveshaft 67 and is multiplied by a conversion factor k, the charge-discharge power demand Pb*, and a potential loss. A temporary target rotational speed Netmp and a temporary target torque Tetmp of the engine 22 are subsequently set corresponding to the power demand P* set at step S110 on the assumption that the engine 22 is operated to output power equivalent to the power demand P* (step S120). A concrete procedure of the embodiment refers to an operation curve provided in advance for the efficient operation of the engine 22 and the improved fuel consumption and sets the temporary target rotational speed Netmp and the temporary target torque Tetmp corresponding to the power demand P*. FIG. 14 shows an operation curve of the engine 22 and a correlation curve between the engine rotational speed Ne and the engine torque Te (constant power curve). As clearly shown in FIG. 14, the temporary target rotational speed Netmp and the temporary target torque Tetmp are obtained as an intersection of the operation curve and the correlation curve of constant power demand P* (=Ne×Te).

Figure 15:
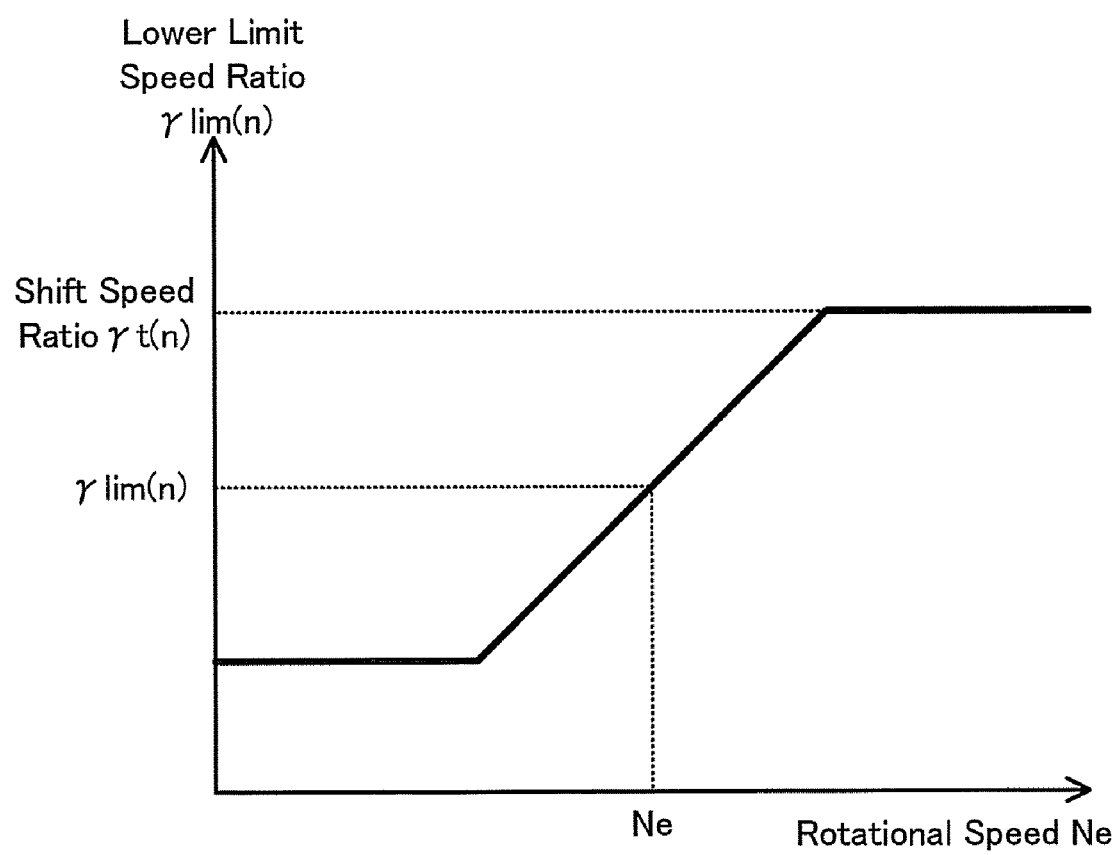
FIG. 15 shows one example of a lower limit speed ratio setting map.

After setting the temporary target rotational speed Netmp and the temporary target torque Tetmp, the CPU 72 sets a required speed ratio γr as a required value of the speed ratio between the engine 22 (crankshaft 26) and the driveshaft 67, a lower limit speed ratio γlim(n) as a lower limit value of the speed ratio between the engine 22 and the driveshaft 67 in the currently active speed gear train (n-th speed gear train), an upper side shift speed ratio γtu(n) of the currently active speed gear train, and a lower side shift speed ratio γtd(n) of the currently active speed gear train (step S130). The required speed ratio γr represents a speed ratio between the engine 22 and the driveshaft 67 in the currently active speed gear train in the state of efficient operation of the engine 22 according to the operation curve of FIG. 14. The required speed ratio γr is obtained by dividing the temporary target rotational speed Netmp set at step S120 by the rotational speed of the driveshaft 67 (the product of the vehicle speed V and the conversion factor k). The lower limit speed ratio γlim(n) is defined for each of the first speed state to the fourth speed state (first speed gear train to fourth speed gear train) in the transmission 60. A concrete procedure of the embodiment refers to a lower limit speed ratio setting map provided and stored in advance in the ROM 74 to set the lower limit speed ratio γlim(n). The lower limit speed ratio setting map defines a relationship between the lower limit speed ratio γlim(n) and the rotational speed Ne of the engine 22 with respect to each speed change state (speed gear train) of the transmission 60. The lower limit speed ratio γlim(n) corresponding to the rotational speed Ne of the engine 22 input at step S100 is derived and set from the lower limit speed ratio setting map at step S130. FIG. 15 shows one example of the lower limit speed ratio setting map. The lower limit speed ratio setting map of FIG. 15 is designed to set a relatively small value to the lower limit speed ratio γlim(n) when the rotational speed Ne of the engine 22 is in a predetermined low rotational speed range. Such setting aims to prevent a power transmission efficiency ηed between the engine 22 and the driveshaft 67 at the speed ratio between the engine 22 and the driveshaft 67 equal to the lower limit speed ratio γlim(n) in an n-th speed state from being lower than the power transmission efficiency ηed in an (n+1)-th speed state. This makes the power transmission efficiency ηed close to the value '1'. The lower limit speed ratio setting map of FIG. 15 is designed to gradually increase the lower limit speed ratio γlim(n) with an increase of the rotational speed Ne out of the predetermined low rotational speed range. When the increasing rotational speed Ne reaches a certain level, the lower limit speed ratio γlim(n) is set equal to an n-th shift speed ratio γt(n) of the n-th speed gear train. Namely the lower limit speed ratio γlim(n) of the n-th speed gear train is equal to or less than the n-th shift speed ratio γt(n) of the n-th speed gear train (that is, a first shift speed ratio γt(1) for the first speed gear train, a second shift speed ratio γt(2) for the second speed gear train, and a third shift speed ratio γt(3) for the third speed gear train). The fourth speed gear train (fourth speed state) is the uppermost speed state and naturally has no speed ratio for an upshift. The lower limit speed ratio γlim(4) of the fourth speed gear train is accordingly set equal to or less than the third shift speed ratio γt(3) in the embodiment. The upper side shift speed ratio γtu(n) represents a speed ratio between the engine 22 and the driveshaft 67 for an upshift of the speed change state of the transmission 60. The upper side shift speed ratio γtu(n) is equal to the n-th shift speed ratio γt(n) when the currently active speed gear train of the transmission 60 is the n-th speed gear train. Namely the upper side shift speed ratio γtu(n) is equal to the first shift speed ratio γt(1) for the first speed gear train as the currently active speed gear train, the second shift speed ratio γt(2) for the second speed gear train, and the third shift speed ratio γt(3) for the third speed gear train. The uppermost fourth speed gear train (fourth speed state) has no speed ratio for an upshift as mentioned above. The upper side shift speed ratio γtu(4) of the fourth speed gear train is accordingly set to a specific value adequate for control in the embodiment. The lower speed ratio γtd(n) represents a speed ratio between the engine 22 and the driveshaft 67 for a downshift of the speed change state of the transmission 60. The lower side shift speed ratio γtd(n) is equal to an (n−1)-th shift speed ratio γt(n−1) when the currently active speed gear train of the transmission 60 is the n-th speed gear train. Namely the lower side shift speed ratio γtd(n) is equal to the first shift speed ratio γt(1) for the second speed gear train as the currently active speed gear train, the second shift speed ratio γt(2) for the third speed gear train, and the third shift speed ratio γt(3) for the fourth speed gear train. The lowermost first speed gear train (first speed state) naturally has no speed ratio for a downshift. The lower side shift speed ratio γtd(1) of the first speed gear train is accordingly set to a specific value adequate for control in the embodiment.

Referring back to the flowchart of FIG. 12, it is identified whether the upshift flag Fu input at step S100 is equal to 0 (step S140). Upon identification of the upshift flag Fu equal to 0, it is further identified whether the downshift flag Fd input at step S100 is equal to 0 (step S150). Upon identification of the downshift flag Fd equal to 0, a comparison is made between the required speed ratio γr and the lower limit speed ratio γlim(n), which are both set at step S130 (step S160). When the required speed ratio γr is higher than the lower limit speed ratio γlim(n), a comparison is further made between the required speed ratio γr and the lower side shift speed ratio γtd(n) (step S170). When the required speed ratio γr is higher than the lower limit speed ratio γlim(n) and is lower than the lower side shift speed ratio γtd(n), an affirmative answer is given at step S170. In this case, the speed change state of the transmission 60 (currently active speed gear train) is not changed but is kept without any upshift or downshift. The temporary target rotational speed Netmp and the temporary target torque Tetmp set at step S120 are respectively set to a target rotational speed Ne* and a target torque Te* of the engine 22 (step S180). The CPU 72 subsequently identifies the currently active speed gear train among the first speed gear train to the fourth speed gear train, based on the current speed 'n' input at step S100 (step S190).

When the currently active speed gear train is either the first speed gear train or the third speed gear train, the carrier shaft 45a is connected to the driveshaft 67 by means of the transmission 60. In this case, a target rotational speed Nm1* of the motor MG1 is calculated from the target rotational speed Ne* of the engine 22 set at step S180, a rotational speed of the carrier shaft 45a (=Nm2·ρr), and the gear ratio ρ of the power distribution integration mechanism 40 according to Equation (1) given below (step S200):

$$Nm1^* = 1/\rho[Ne^* + (1-\rho) \cdot Nm2 \cdot \rho r] \qquad (1)$$

A torque command Tm1* of the motor MG1 is then computed from the calculated target rotational speed Nm1* and the current rotational speed Nm1 of the motor MG1 according to Equation (2) given below (step S200):

$$Tm1^* = \text{Previous } Tm1^* + k11(Nm1^* - Nm1) + k12 \int (Nm1^* - Nm1)dt \qquad (2)$$

Equation (1) is a dynamic relational expression of respective rotational elements included in the power distribution integration mechanism 40. Equation (1) is readily obtained from the alignment chart of FIG. 9. Equation (2) is a relational expression of feedback control to drive and rotate the motor MG1 at the target rotational speed Nm1*. In Equation (2) given above, 'k11' in the second term and 'k12' in the third term on the right side respectively denote a gain of the proportional and a gain of the integral term. The CPU 72 subsequently calculates a lower torque restriction Tmin and an upper torque restriction Tmax as allowable minimum and maximum torques output from the motor MG2 (step S210). The lower torque restriction Tmin and the upper torque restriction Tmax are obtained by dividing respective differences between the input limit Win or the output limit Wout of the battery 35 and power consumption (power generation) of the motor MG1, which is equal to the product of the torque command Tm1* of the motor MG1 computed at step S200 and the current rotational speed Nm1 of the motor MG1, by the current rotational speed Nm2 of the motor MG2. The CPU 72 then calculates a temporary motor torque Tm2tmp as torque to be output from the motor MG2 from the torque demand Tr*, the torque command Tm1* of the motor MG1, the gear ratio G(n) of the currently active speed gear train, and the gear ratio ρ of the power distribution integration mechanism 40 according to Equation (3) given below (step S220):

$$Tm2tmp = -\rho r \cdot [Tr^*/G(n) + (1-\rho)/\rho \cdot Tm1] \quad (3)$$

Equation (3) is also readily obtained from the alignment chart of FIG. 9. The CPU 72 then limits the calculated temporary motor torque Tm2tmp by the lower and the upper torque restrictions Tmin and Tmax calculated at step S210 to set a torque command Tm2* of the motor MG2 (step S230). Setting the torque command Tm2* of the motor MG2 in this manner restricts the torque output to the carrier shaft 45a in the range of the input limit Win and the output limit Wout of the battery 35. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 30 (step S240). The drive control routine then returns to step S100 and repeats the processing of and after step S100. The engine ECU 24 receives the settings of the target rotational speed Ne* and the target torque Te* and performs required controls of the engine 22 to attain the target rotational speed Ne* and the target torque Te*. The motor ECU 30 receives the settings of the torque commands Tm1* and Tm2* and performs switching control of switching elements included in the respective inverters 31 and 32 to drive the motor MG1 with the torque command Tm1* and the motor MG2 with the torque command Tm2*.

When the currently active speed gear train is either the second speed gear train or the fourth speed gear train, the first motor shaft 46 is connected to the driveshaft 67 by means of the transmission 60. In this case, a target rotational speed Nm2* of the motor MG2 is calculated from the target rotational speed Ne* of the engine 22 set at step S180, the rotational speed Nm1 of the first motor shaft 46 (sun gear 41), and the gear ratio ρ of the power distribution integration mechanism 40 according to Equation (4) given below (step S250):

$$Nm2^* = (\rho \cdot Nm1 - Ne^*)/(1-\rho) \cdot \rho r \quad (4)$$

The torque command Tm2* of the motor MG2 is then computed from the calculated target rotational speed Nm2* and the current rotational speed Nm2 of the motor MG2 according to Equation (5) given below (step S250):

$$Tm2^* = \text{Previous } Tm2^* + k21(Nm2^* - Nm2) + k22\int (Nm2^* - Nm2)dt \quad (5)$$

Equation (4) is also a dynamic relational expression of the respective rotational elements included in the power distribution integration mechanism 40. Equation (4) is readily obtained from the alignment chart of FIG. 10. Equation (5) is a relational expression of feedback control to drive and rotate the motor MG2 at the target rotational speed Nm2*. In Equation (5) given above, 'k21' in the second term and 'k22' in the third term on the right side respectively denote a gain of the proportional and a gain of the integral term. The CPU 72 subsequently calculates a lower torque restriction Tmin and an upper torque restriction Tmax as allowable minimum and maximum torques output from the motor MG1 (step S260). The lower torque restriction Tmin and the upper torque restriction Tmax are obtained by dividing respective differences between the input limit Win or the output limit Wout of the battery 35 and power consumption (power generation) of the motor MG2, which is equal to the product of the torque command Tm2* of the motor MG2 computed at step S250 and the current rotational speed Nm2 of the motor MG2, by the current rotational speed Nm1 of the motor MG1. The CPU 72 then calculates a temporary motor torque Tm1tmp as torque to be output from the motor MG1 from the torque demand Tr*, the torque command Tm2* of the motor MG2, the gear ratio G(n) of the currently active speed gear train, and the speed reduction ratio ρr of the reduction gear mechanism 50 according to Equation (6) given below (step S270):

$$Tm1tmp = Tr^*/(G(n) - \rho/(1-\rho) \cdot Tm2^*/\rho r \quad (6)$$

Equation (6) is also readily obtained from the alignment chart of FIG. 10. The CPU 72 then limits the calculated temporary motor torque Tm1tmp by the lower and the upper torque restrictions Tmin and Tmax calculated at step S260 to set the torque command Tm1* of the motor MG1 (step S280). Setting the torque command Tm1* of the motor MG1 in this manner restricts the torque output to the first motor shaft 46 in the range of the input limit Win and the output limit Wout of the battery 35. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 30 (step s240). The drive control routine then returns to step S100 and repeats the processing of and after step S100.

In the first speed state of the transmission 60 with connection of the carrier shaft 45a with the driveshaft 67 via the first speed gear train, the efficient control procedure shifts the speed change state (speed gear train) of the transmission 60 from the first speed state (first speed gear train) to the second speed state (second speed gear train) when the speed ratio between the engine 22 and the driveshaft 67 reaches the first shift speed ratio γt(1) in response to an increase of the vehicle speed V. As clearly understood from FIG. 16, however, the power transmission efficiency ηed between the engine 22 and the driveshaft 67 basically has a higher value under the condition that the speed ratio between the engine 22 and the driveshaft 67 is lower than the n-th shift speed ratio γt(n). The hybrid vehicle 20 of the embodiment sets the lower limit speed ratio γlim(n) that is less than the n-th shift speed ratio γt(n) of the n-th speed gear train, with respect to each speed change state of the transmission 60 as explained above. In the case where the required speed ratio γr is higher than the lower limit speed ratio γlim(n) in selection of a certain speed state of the transmission 60, the currently active speed gear train is not changed but is kept without any upshift change of the speed change state even when the required speed ratio γr becomes equal to the n-th shift speed ratio γt(n). This aims to improve the power transmission efficiency ηed in the wider driving range. In the case where the required speed ratio γr reaches or exceeds the lower side shift speed ratio γtd(n) in selection of a certain speed state of the transmission 60, on the other hand, keeping the currently active speed gear train unchanged undesirably lowers the power transmission efficiency ηed between the engine 22 and the driveshaft 67. In an increasing tendency of the required speed ratio γr, the hybrid vehicle 20 of the embodiment thus keeps the currently active speed gear train unchanged until the required speed ratio γr reaches or exceeds the lower side shift speed ratio γtd(n), while implementing a downshift change of the speed change state when the required speed ratio γr reaches or exceeds the lower side shift speed ratio γtd(n).

When it is determined at step S160 that the required speed ratio γr is equal to or less than the lower limit speed ratio γlim(n), the upshift flag Fu is set equal to 1 for an upshift change of the speed change state of the transmission 60 (step S290). The upper side shift speed ratio γtu(n) set at step S130 is then specified as an effective shift speed ratio γt (step S310) in the flowchart of FIG. 13. When it is determined at step S170 that the required, speed ratio γr is not lower than the lower side shift speed ratio γtd(n), the downshift flag Fd is set equal to 1 for a downshift change of the speed change state of the transmission 60 (step S300). The lower side shift speed ratio γtd(n) set at step S130 is then specified as the effective shift speed ratio γt (step S320) in the flowchart of FIG. 13. After the processing of either step S310 or step S320, the target rotational speed Ne* and the target torque Te* of the engine 22 are computed from the setting of the effective shift speed ratio γt (step S330). For an upshift change or a downshift change of the speed gear train of the transmission 60, it is required to make the speed ratio between the engine 22 (crankshaft 26) and the driveshaft 67 equal to the effective shift speed ratio γt. The CPU 72 sets the rotational speed of the engine 22 (shift rotational speed) determined on the basis of the effective shift speed ratio γt and the rotational speed of the driveshaft 67, that is, the product of the effective shift speed ratio γt and the vehicle speed V multiplied by the conversion factor k, to the target rotational speed Ne* and sets the result of the division of the power demand P* set at step S110 by the target rotational speed Ne* to the target torque Te* at step S330. Namely the procedure of step S330 sets the target rotational speed Ne* and the target torque Te* on the correlation curve of constant power demand P* (constant power curve) set at step S110, in order to make the rotational speed Ne of the engine 22 equal to the shift rotational speed determined on the basis of the effective shift speed ratio γt (see FIG. 14), instead of setting the target rotational speed Ne* and the target torque Te* representing an operation point of the engine 22 as the intersection of the operation curve and the correlation curve of constant power demand P.

Figure 17:
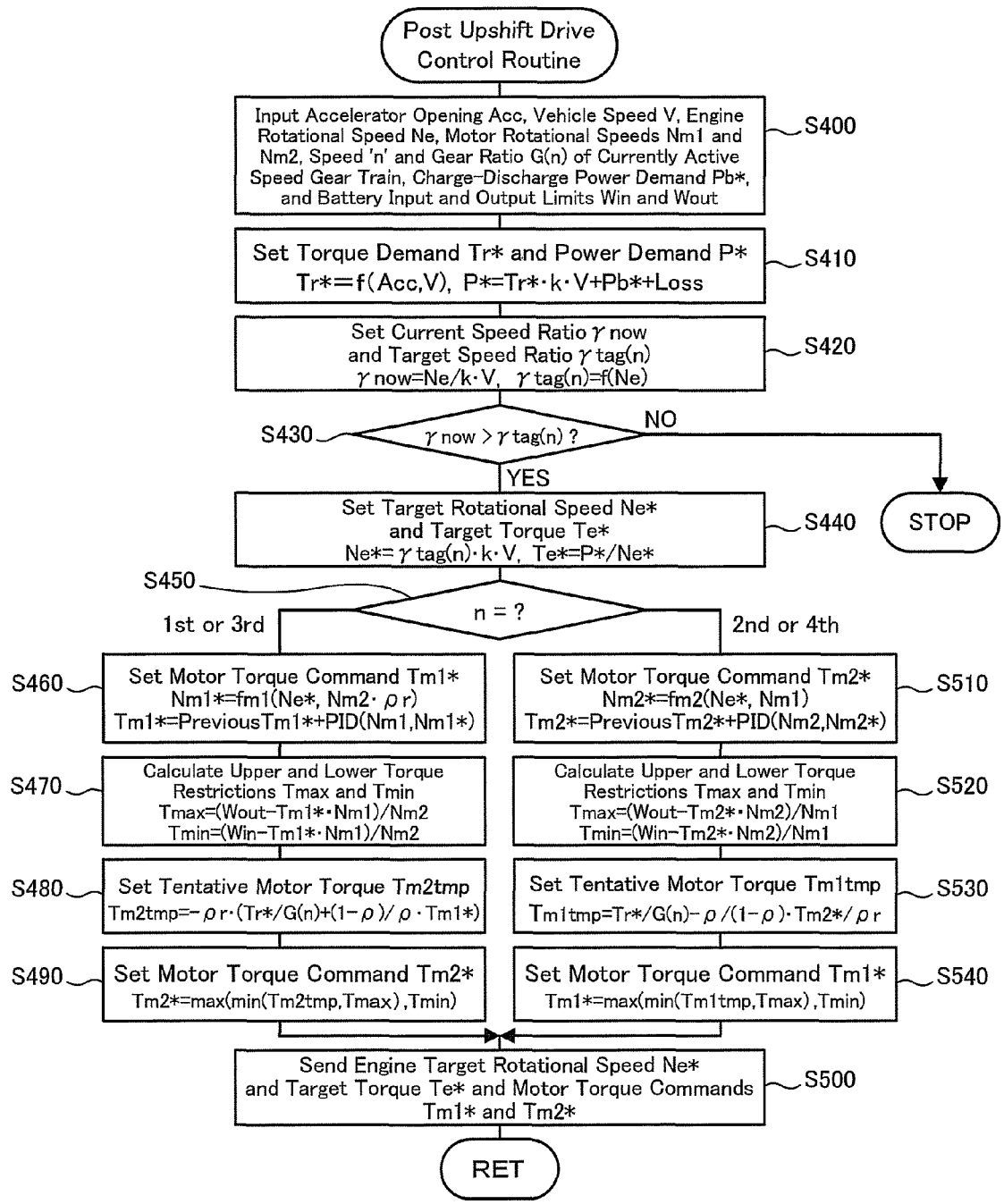
FIG. 17 is a flowchart showing a post upshift drive control routine performed by the hybrid ECU 70 after an upshift change of the speed change state of the transmission 60.
Figure 18:
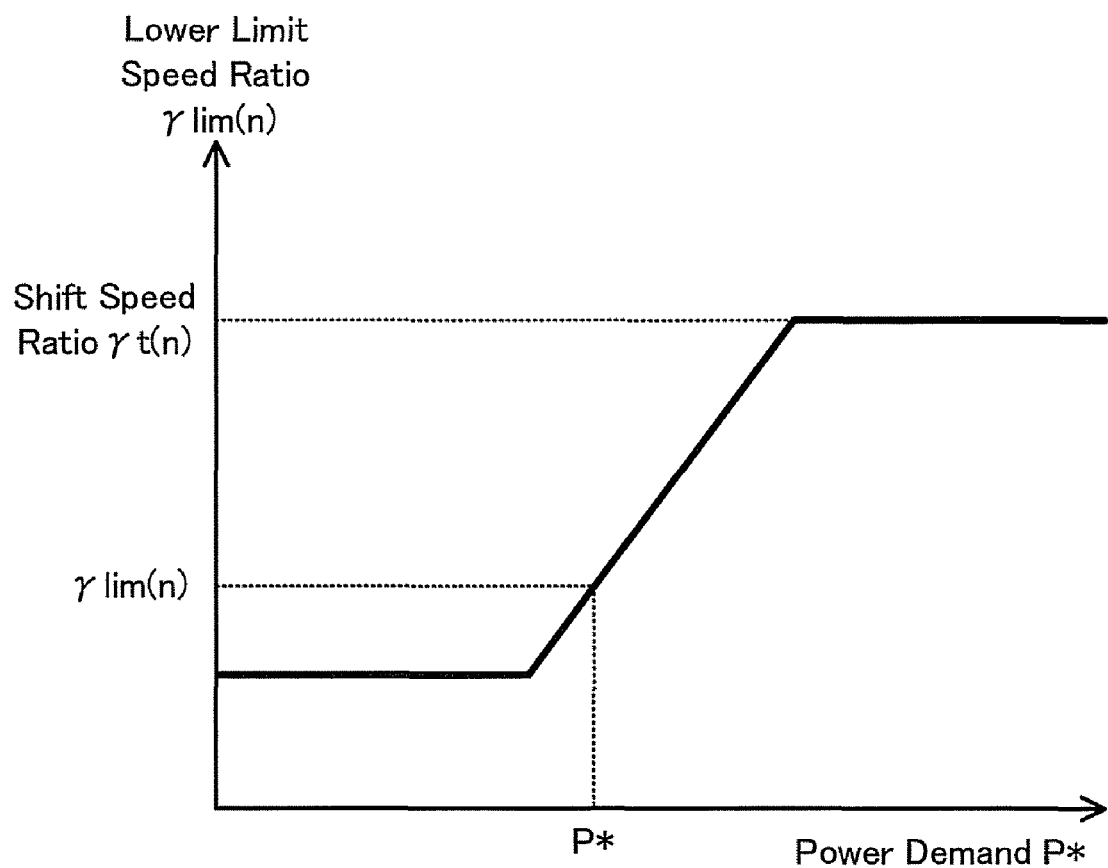
FIG. 18 shows another example of the lower limit speed ratio setting map.

It is subsequently determined whether the rotational speed Ne of the engine 22 input at step S100 is approximately equal to the target rotational speed Ne* set at step S330 (step S340). When the input rotational speed Ne of the engine 22 is significantly different from the target rotational speed Ne*, the drive control routine goes to step S190 and executes the processing of and after step S190. In this case, a subsequent processing cycle starting from step S100 after completion of step S240 identifies that the upshift flag Fu is equal to 1 at step S140 or that the downshift flag Fd is equal to 1 at step S150. The processing of and after either step S310 or step S320 (FIG. 13) is accordingly repeated. Upon determination at step S340 that the input rotational speed Ne of the engine 22 is approximately equal to the target rotational speed Ne* set at step S330, it is then identified whether the upshift flag Fu is equal to 1 (step S350). Upon identification of the upshift flag Fu equal to 1 at step S350, the CPU 72 resets the upshift flag Fu to 0, increments the speed 'n' of the currently active speed gear train in the transmission 60 by one to a value corresponding to an upshift change of the speed change state of the transmission 60, and sets a specific flag Fuaft to 1 (step S360). Setting the specific flag Fuaft to 1 gives an instruction for executing a post upshift drive control routine discussed later. Upon identification of the upshift flag Fu equal to 0 at step S350, on the other hand, it means that the downshift flag Fd is equal to 1. In this case, the CPU 72 resets the downshift flag Fd to 0 and decrements the speed 'n' of the currently active speed gear train in the transmission 60 by one to a value corresponding to a downshift change of the speed change state of the transmission 60 (step S370). After the processing of either step S360 or step S370, an upshift command or a downshift command corresponding to the new speed 'n' of the new currently active speed gear train is sent to the transmission 60 (actuator 88) (step S380). The upshift command or the downshift command is given to connect one of the carrier shaft 45a and the first motor shaft 46, which is previously not connected to the driveshaft 67, to the driveshaft 67 by means of the transmission 60 and to release the connection of the other of the carrier shaft 45a and the first motor shaft 46 with the driveshaft 67. The drive control routine then goes to step S190 and executes the processing of and after step S190. On the occasion of an upshift change of the currently active speed gear train in the transmission 60, the specific flag Fuaft is set to 1 at step S360. The post upshift drive control routine shown in FIG. 17 is then performed after the processing of step S380 and steps S190 to S240. On the occasion of a downshift change of the currently active speed gear train in the transmission 60, on the other hand, the processing of and after step S100 is basically repeated after the processing of step S380 and steps S190 to S240.

FIG. 17 is a flowchart showing the post upshift drive control routine, which is performed at predetermined time intervals (for example, at every several msec) by the hybrid ECU 70 after an upshift change of the speed change state (speed gear train) of the transmission 60. At the start of the post upshift drive control routine of FIG. 17, the CPU 72 of the hybrid ECU 70 inputs various data required for control, for example, the accelerator opening Acc, vehicle speed V, the rotational speed Ne of the engine 22, the rotational speeds Nm1 and Nm2 of the motors MG1 and MG2, the speed 'n' and the gear ratio G(n) of the currently active speed gear train in the transmission 60, the charge discharge power demand Pb*, and the input and output limits Win and Wout of the battery 35 (step S400) in the same manner as step S100 in the drive control routine of FIG. 12. After the data input at step S400, the CPU 72 sets the torque demand Tr* to be output to the driveshaft 67 and the power demand P* required for the whole hybrid vehicle 20, based on the input accelerator opening Acc and the input vehicle speed V (step S410).

Figure 16:
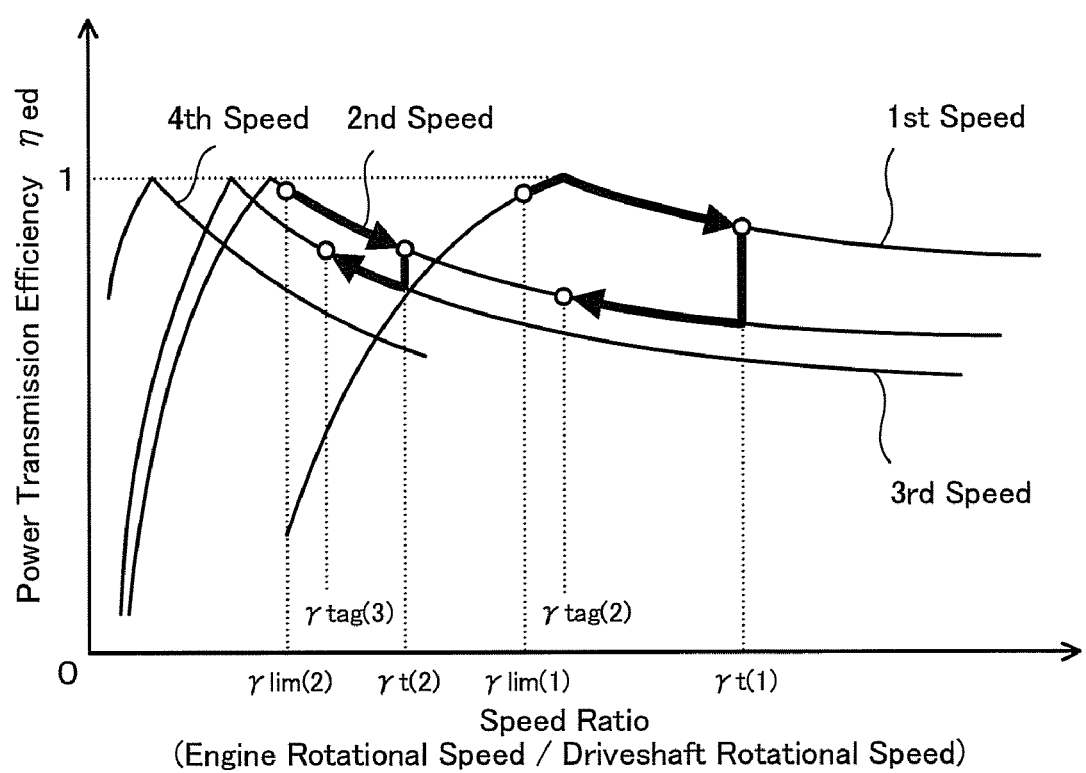
FIG. 16 shows variations of a power transmission efficiency $\eta$ed between the engine 22 and a driveshaft 67 with respect to respective speed change states of the transmission 60 in the hybrid vehicle 20 of the embodiment.

A current speed ratio γnow and a target speed ratio γtag(n) are subsequently set, based on the rotational speed Ne of the engine 22 input at step S400 (step S420). The current speed ratio γnow represents the current setting of the speed ratio between the engine 22 (crankshaft 26) and the driveshaft 67. The current speed ratio γnow is obtained by dividing the rotational speed Ne of the engine 22 input at step S400 by the rotational speed of the driveshaft 67 (equal to the vehicle speed V multiplied by the conversion factor k). The target speed ratio γtag(n) represents a target value of the speed ratio between the engine 22 and the driveshaft 67 in the second speed state to the fourth speed state (second gear train to fourth gear train) after an upshift change of the speed change state of the transmission 60 in the drive control routine of FIGS. 12 and 13. A concrete procedure of the embodiment provides and stores in advance a variation in target speed ratio γtag(n) against the rotational speed Ne of the engine 22 as a target speed ratio setting map (not shown) in the ROM 74 and sets the target speed ratio γtag(n) corresponding to the given rotational speed Ne from this target speed ratio setting map. In this embodiment, the target speed ratio setting map is provided for each of the second speed state to the fourth speed state of the transmission 60. The target speed ratio setting map is designed to give a predetermined smaller value to a target speed ratio γtag(x) in an x-th speed state than a lower limit speed ratio γlim(x−1) in an (x−1)-th speed state, where x (x=2, 3, 4) denotes the speed of the currently active speed gear train after a shift (upshift change) of the speed change state of the transmission 60. After an upshift of the speed change state from the (x−1)-th speed state to the x-th speed state where a smaller value can be set as the speed ratio between the engine 22 and the driveshaft 67 in comparison with the (x−1)-th speed state, the control makes the speed ratio between the engine 22 and the driveshaft 67 equal to the lower limit speed ratio γlim(x−1) in the (x−1)-th speed state. Such control undesirably lowers the power transmission efficiency ηed between the engine 22 and the driveshaft 67, compared with the control of setting the speed ratio between the engine 22 and the driveshaft 67 to the lower limit speed ratio γlim(x−1) in the (x−1)-th speed state, as shown in FIG. 16. The lowered power transmission efficiency ηed naturally leads to the lowered driving force output to the driveshaft 67. Based on such findings, the procedure of the embodiment sets the target speed ratio γtag(n) as discussed above, in order to prevent a decrease of the driving force output to the driveshaft 67 after an upshift change of the speed change state of the transmission 60. The post upshift drive control routine of FIG. 17 is performed to quickly make the speed ratio between the engine 22 and the driveshaft 67 equal to the target speed ratio γtag(n)

After setting the current speed ratio γnow and the target speed ratio γtag(n) at step S420, it is determined whether the current speed ratio γnow is higher than the target speed ratio γtag(n) (step S430). When the current speed ratio γnow is higher than the target speed ratio γtag(n), the CPU 72 sets the rotational speed of the engine 22 determined on the basis of the target speed ratio γtag(n) and the rotational speed of the driveshaft 67, that is, the product of the target speed ratio γtag(n) and the vehicle speed V multiplied by the conversion factor k, to the target rotational speed Ne* and sets the result of the division of the power demand P* set at step S410 by the target rotational speed Ne* to the target torque Te* (step S440). Namely the procedure of step S440 sets the target rotational speed Ne* and the target torque Te* on the correlation curve of constant power demand P* (constant power curve) set at step S410, in order to make the rotational speed Ne of the engine 22 equal to the rotational speed determined on the basis of the target speed ratio γtag(n) (see the broken line curve in FIG. 14), instead of setting the target rotational speed Ne* and the target torque Te* representing the operation point of the engine 22 as the intersection of the operation curve and the correlation curve of constant power demand P*. The CPU 72 subsequently identifies the currently active speed gear train among the first speed gear train to the fourth speed gear train, based on the current speed 'n' input at step S400 (step S450). When the currently active speed gear train is either the first speed gear train or the third speed gear train, the CPU 72 performs the processing of steps S460 to S490, which is equivalent to the processing of steps S200 to S230 in the drive control routine of FIG. 12, sends the settings of the target values (step S500), and repeats the processing of and after step S400. When the currently active speed gear train is either the second speed gear train or the fourth speed gear train, on the other hand, the CPU 72 performs the processing of steps S510 to S540, which is equivalent to the processing of steps S250 to S280 in the drive control routine of FIG. 12, sends the settings of the target values (step S500), and repeats the processing of and after step S400. The post upshift drive control routine is terminated upon determination at step S430 that the current speed ratio γnow is equal to or less than the target speed ratio γtag(n). The drive control routine of FIGS. 12 and 13 is then performed.

As described above, when the required speed ratio γr between the engine 22 (crankshaft 26) and the driveshaft 67 becomes equal to or less than the lower limit speed ratio γlim(n) that is less than the n-th shift speed ratio γt(n) during the n-th speed state of the transmission 60, the hybrid vehicle 20 of the embodiment controls the engine 22, the motors MG1 and MG2, and the transmission 60 to ensure output of power based on the torque demand Tr* to the driveshaft 67 while performing the engine rotational speed adjustment (steps S310, S330, S200 to S240 or S250 to S280, and S240) and the shift from the n-th speed state to the (n+1)-th speed state (step S380). Here, the engine rotational speed adjustment makes the rotational speed Ne of the engine 22 equal to the shift rotational speed (=γt/k·V) corresponding to the effective shift speed ratio γt or the upper side shift speed ratio γtu(n) that is equal to the n-th shift speed ratio γt(n). Instead of a shift of the speed change state of the transmission 60 (the element of the power distribution integration mechanism 40 connected to the driveshaft 67) at the stage when the required speed ratio γr reaches the upper side shift speed ratio γtu(n) that is equal to the n-th shift speed ratio γt(n), the hybrid vehicle 20 of the embodiment makes a shift of the speed change state of the transmission 60 at the stage when the required speed ratio γr becomes equal to or less than the lower limit speed ratio γlim(n) that is less than the n-th shift speed ratio γt(n). The lower speed ratio between the engine 22 and the driveshaft 67 leads to the higher power transmission efficiency ηed between the engine 22 and the driveshaft 67 (see FIG. 16), thereby further improving the power transmission efficiency ηed. When the required speed ratio γr becomes equal to or less than the lower limit speed ratio γlim(n) during the n-th speed state of the transmission 60, the engine rotational speed adjustment in combination with the shift from the n-th speed state to the (n+1)-th speed state ensures a smooth shift of the speed change state of the transmission 60, while effectively preventing an excess increase of the rotational speed Ne of the engine 22. Such drive control allows adequate changeover between the connection of the carrier 45 (carrier shaft 45a) of the power distribution integration mechanism 40 with the driveshaft 67 and the connection of the sun gear 41 (first motor shaft 46) with the driveshaft 67 and improves the power transmission efficiency in the wider driving range, thereby attaining both high fuel consumption and the favorable driving performance.

When the required speed ratio γr is higher than the lower limit speed ratio γlim(n) during the n-th speed state of the transmission 60, the hybrid vehicle 20 of the embodiment sets the target rotational speed Ne* and the target torque Te* as the operation point of the engine 22 based on the curve of the power demand P* calculated from the torque demand Tr* and the operation curve set in advance for the efficient operation of the engine 22 and the improved fuel consumption (steps S120 and S180). During the n-th speed state in the transmission 60, such drive control ensures the efficient operation of the engine 22 and attains the improved fuel consumption until the required speed ratio γr becomes equal to or less than the lower limit speed ratio γlim(n). During the engine rotational speed adjustment of making the speed ratio between the engine 22 and the driveshaft 67 equal to the effective shift speed ratio γt for an upshift change or a downshift change of the speed change state in the transmission 60 or in the post upshift drive control routine of making the speed ratio between the engine 22 and the driveshaft 67 equal to the target speed ratio γtag(n) after an upshift change of the speed change state in the transmission 60, the hybrid vehicle 20 of the embodiment sets the target rotational speed Ne* of the engine 22 to make the rotational speed Ne of the engine 22 equal to the rotational speed corresponding to the effective shift speed ratio γt or the target speed ratio γtag(n). The hybrid vehicle 20 of the embodiment subsequently sets the target torque Te* of the engine 22 based on the target rotational speed Ne* and the power demand Tr* to ensure output of the power demand P* corresponding to the torque demand Tr* from the engine 22 (steps S330 and S440). This process prevents a significant variation in output power of the engine 22 during the engine rotational speed adjustment or in the post upshift drive control routine.

In the hybrid vehicle 20 of the embodiment, the lower limit speed ratio γlim(n) is set based on the rotational speed Ne of the engine 22 (crankshaft 26) (step S130). This ensures the adequate setting of the lower limit speed ratio γlim(n). By using the lower limit speed ratio setting map shown in FIG. 15, when the rotational speed Ne of the engine 22 is in the relatively low rotational speed range, the lower limit speed ratio γlim(n) in the n-th speed state is set to prevent the power transmission efficiency ηed between the engine 22 and the driveshaft 67 from being lower than the power transmission efficiency ηed in the (n+1)-th speed state when the speed ratio between the engine 22 and the driveshaft 67 becomes the lower limit speed ratio γlim(n) in the n-th speed state. Such setting ensures the satisfactory power transmission efficiency ηed between the engine 22 and the driveshaft 67 with respect to each of the multiple different speed change states in the transmission 60. By using the lower limit speed ratio setting map shown in FIG. 15, when the rotational speed Ne of the engine 22 is relatively high, the lower limit speed ratio γlim(n) is set to a relatively large value or set equal to the n-th shift speed ratio γt(n). This effectively prevents the rotational speed Ne of the engine 22 from exceeding a predetermined upper limit value and prevents the occurrence of noise or vibration of the engine 22 in the course of the engine rotational speed adjustment at the time of an upshift change of the speed change state of the transmission 60 in response to the decrease of the required speed ratio γr to or below the lower limit speed ratio γlim(n) at a relatively high level of the rotational speed Ne of the engine 22. The lower limit speed ratio γlim(n) may be set based on the power demand P* or the output power of the engine 22 according to a lower limit speed ratio setting map shown in FIG. 18 or may be set based on both the rotational speed Ne of the engine 22 and the output power of the engine 22 (power demand P*).

In the hybrid vehicle 20 of the embodiment, the lower limit speed ratio γlim(n) is set with respect to each speed change state (speed gear train) of the transmission 60. The currently active speed gear train is thus kept unchanged until the required speed ratio γr becomes equal to or less than the lower limit speed ratio γlim(n) in each speed change state of the transmission 60. This ensures further improvement of the power transmission efficiency ηed between the engine 22 and the driveshaft 67. The post upshift drive control routine of FIG. 17 is performed after an upshift change of the speed change state in the transmission 60 in response to the decrease of the required speed ratio γr to or below the lower limit speed ratio γlim(n). After a shift from the n-th speed state to the (n+1)-th speed state, the engine 22 and the motors MG1 and MG2 are controlled to make the speed ratio between the engine 22 (crankshaft 26) and the driveshaft 67 lower than the lower limit speed ratio γlim(n) in the n-th speed state by a predetermined value. Such drive control desirably prevents a decrease of the driving force output to the driveshaft 67. When the required speed ratio γr becomes equal to the lower side shift speed ratio γtd(n) during the (n+1)-th speed state of the transmission 60, the hybrid vehicle 20 of the embodiment controls the engine 22, the motors MG1 and MG2, and the transmission 60 to ensure output of power based on the torque demand Tr* to the driveshaft 67 while performing the engine rotational speed adjustment (steps S320, S330, S200 to S240 or S250 to S280, and S240) and the shift from the (n+1)-th speed state to the n-th speed state (step S380). Here the engine rotational speed adjustment makes the rotational speed Ne of the engine 22 equal to the shift rotational speed (=γt/k·V) corresponding to the effective shift speed ratio γt or the lower side shift speed ratio γtd(n). In response to an increase of the required speed ratio γr, the speed change state of the transmission 60 is shifted from the (n+1)-th speed state to the n-th speed state where a greater value can be set as the speed ratio between the engine 22 and the driveshaft 67. This further improves the power transmission efficiency ηed between the engine 22 and the driveshaft 67.

The transmission 60 of the embodiment is the parallel shaft-type transmission constructed to have the first speed change mechanism including the first speed gear train and the third speed gear train as the parallel shaft-type gear trains for connecting the carrier 45 as the first element of the power distribution integration mechanism 40 with the driveshaft 67 and the second speed change mechanism including the second speed gear train and the fourth speed gear train as the parallel shaft-type gear trains for connecting the first motor shaft 46 of the motor MG1 with the driveshaft 67. The hybrid vehicle of the embodiment may adopt a planetary gear-type transmission, in place of the parallel shaft-type transmission 60.

Figure 19:
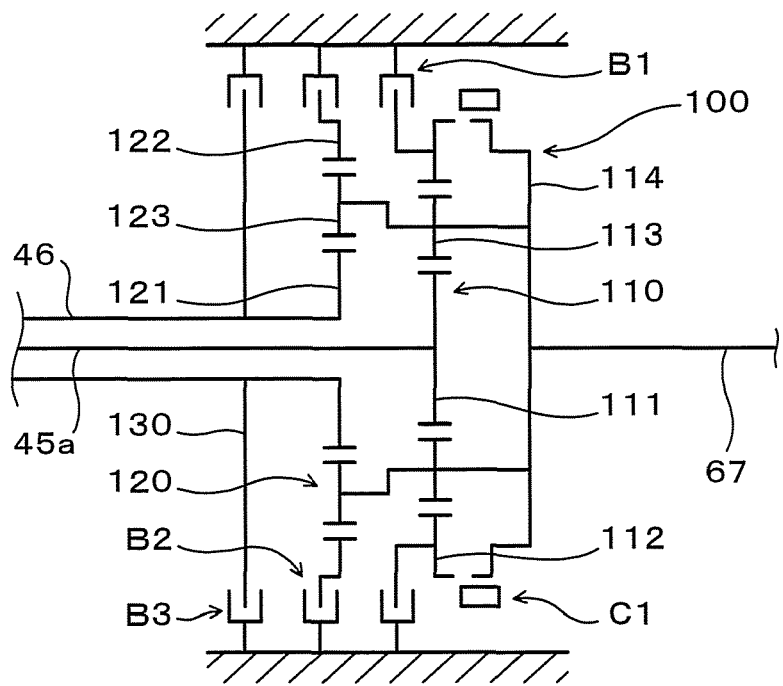
FIG. 19 shows a schematic block diagram of another transmission 100 applicable to the hybrid vehicle 20 of the embodiment.

FIG. 19 shows the schematic structure of one planetary gear-type transmission 100 applicable to the hybrid vehicle 20 of the embodiment. The transmission 100 shown in FIG. 19 is designed to have a speed change state (speed ratio) selectively changeable among multiple different stages. The transmission 100 includes a first change-speed planetary gear mechanism 110, a second change-speed planetary gear mechanism 120, a brake B1 (first fixation mechanism) provided for the first change-speed planetary gear mechanism 110, a brake B2 (second fixation mechanism) provided for the second change-speed planetary gear mechanism 120, a brake B3 (third fixation mechanism), and a clutch C1 (change-speed connecting disconnecting mechanism). The first change-speed planetary gear mechanism 110 is arranged to connect the carrier 45 (carrier shaft 45a) as the first element of the power distribution integration mechanism 40 to the driveshaft 67. The second change-speed planetary gear mechanism 120 is arranged to connect the first motor shaft 46 of the motor MG1 to the driveshaft 67. The first change-speed planetary gear mechanism 110 and the brake B1 constitute a first speed change mechanism of the transmission 100, and the second change-speed planetary gear mechanism 120 and the brake B2 constitute a second speed change mechanism of the transmission 100. As shown in FIG. 19, the first change-speed planetary gear mechanism 110 is constructed as a single-pinion planetary gear mechanism including a sun gear 111 (input element) connected with the carrier shaft 45a, a ring gear 112 (fixable element) as an internal gear arranged concentrically with the sun gear 111, and a carrier 114 (output element) arranged to hold multiple pinion gears 113 engaging with both the sun gear 111 and the ring gear 112 and connected with the driveshaft 67. The second change-speed planetary gear mechanism 120 is constructed as a single-pinion planetary gear mechanism including a sun gear 121 (input element) connected with the first motor shaft 46, a ring gear 122 (fixable element) as an internal gear arranged concentrically with the sun gear 121, and the common carrier 114 (output element) shared by the first change-speed planetary gear mechanism 110 and arranged to hold multiple pinion gears 123 engaging with both the sun gear 121 and the ring gear 122. In the structure of FIG. 19, the second change-speed planetary gear mechanism 120 is arranged coaxially with and located ahead of the first change-speed planetary gear mechanism 110 in the vehicle body. The second change-speed planetary gear mechanism 120 has a gear ratio ρ2 (ratio of the number of teeth of the sun gear 121 to the number of teeth of the ring gear 122), which is slightly greater than a gear ratio ρ1 (ratio of the number of teeth of the sun gear 111 to the number of teeth of the ring gear 112) of the first change-speed planetary gear mechanism 110.

The brake B1 fixes the ring gear 112 of the first change-speed planetary gear mechanism 110 to a transmission casing to prohibit the rotation of the ring gear 112, while releasing the fixation of the ring gear 112 to allow the rotation of the ring gear 112. The brake B1 is actuated by an electric, electromagnetic, or hydraulic actuator (not shown). The brake B2 fixes the ring gear 122 of the second change-speed planetary gear mechanism 120 to the transmission casing to prohibit the rotation of the ring gear 122, while releasing the fixation of the ring gear 122 to allow the rotation of the ring gear 122. The brake B2 is also actuated by the electric, electromagnetic, or hydraulic actuator (not shown). The brake B3 fixes the first motor shaft 46 or the sun gear 41 as the second element of the power distribution integration mechanism 40 to the transmission casing via a stator 130 fastened to the first motor shaft 46 to prohibit the rotation of the first motor shaft 46, while releasing the fixation of the stator 130 to allow the rotation of the first motor shaft 46. The brake B3 is also actuated by the electric, electromagnetic, or hydraulic actuator (not shown). The clutch C1 connects and disconnects the carrier 114 as the output element with and from the ring gear 112 as the fixable element of the first change-speed planetary gear mechanism 110. The clutch C1 is also actuated by the electric, electromagnetic, or hydraulic actuator (not shown). The transmission 100 of this configuration significantly reduces the dimensions both in the axial direction and in the radial direction, compared with the parallel shaft-type transmission. The first change-speed planetary gear mechanism 110 and the second change-speed planetary gear mechanism 120 are located in the downstream of and are arranged coaxially with the engine 22, the motors MG1 and MG2, and the power distribution integration mechanism 40. The transmission 100 of this arrangement desirably simplifies the bearing structure and reduces the total number of required bearings.

The transmission 100 of this configuration has the speed change state (speed ratio) selectively changeable among the multiple different stages as discussed below. The non-rotatable fixation of the ring gear 112 of the first change-speed planetary gear mechanism 110 to the transmission casing by means of the brake B1 causes the power from the carrier shaft 45a to be subjected to speed change at a speed ratio of (ρ1/(1+ρ1)) based on the gear ratio ρ1 of the first change-speed planetary gear mechanism 110 and to be transmitted to the driveshaft 67 (hereafter this state is referred to as 'first speed state ($1^{st}$ speed)'). The non-rotatable fixation of the ring gear 122 of the second change-speed planetary gear mechanism 120 to the transmission casing by means of the brake B2 causes the power from the first motor shaft 46 to be subjected to speed change at a speed ratio of (ρ2/(1+ρ2)) based on the gear ratio ρ2 of the second change-speed planetary gear mechanism 120 and to be transmitted to the driveshaft 67 (hereafter this state is referred to as 'second speed state ($2^{nd}$ speed)'). The connection of the carrier 114 with the ring gear 112 in the first change-speed planetary gear mechanism 110 by means of the clutch C1 substantially locks and integrally rotates the sun gear 111, the ring gear 112, and the carrier 114 as the constituents of the first change-speed planetary gear mechanism 110 and thereby causes the power from the carrier shaft 45a to be transmitted to the driveshaft 67 at a speed ratio of 1 (hereafter this state is referred to as 'third speed state ($3^{rd}$ speed)'. In the first speed state of the transmission 100, the fixation of the ring gear 122 by means of the brake B2 of the second speed change mechanism connects both the carrier shaft 45a and the first motor shaft 46 to the driveshaft 67 and causes the output power from the engine 22 or the output power from at least one of the motors MG1 and MG2 to be mechanically (directly) transmitted to the driveshaft 67 at a fixed speed ratio (first shift speed ratio) (hereafter this state is referred to as '$1^{st}$ speed-$2^{nd}$ speed simultaneous engagement state'). In the second speed state of the transmission 100, the connection of the carrier 114 with the ring gear 112 in the first change-speed planetary gear mechanism 110 by means of the corresponding clutch C1 connects both the first motor shaft 46 and the carrier 45 to the driveshaft 67 and causes the output power from the engine 22 or the output power from at least one of the motors MG1 and MG2 to be mechanically (directly) transmitted to the driveshaft 67 at a fixed speed ratio (second shift speed ratio) that is different from the fixed speed ratio in the $1^{st}$ speed-$2^{nd}$ speed simultaneous engagement state discussed above (this state is hereafter referred to as '$2^{nd}$ speed-$3^{rd}$ speed simultaneous engagement state'). In the third speed state of the transmission 100, the non-rotatable fixation of the first motor shaft 46 or the sun gear 41 as the second element of the power distribution integration mechanism 40 to the transmission casing via the stator 130 fastened to the first motor shaft 46 by means of the brake B3 causes the output power from the engine 22 or the output power from the motor MG2 to be mechanically (directly) transmitted to the driveshaft 67 at a fixed speed ratio that is different from the fixed speed ratios in the $1^{St}$ speed-$2^{nd}$ speed simultaneous engagement state and in the $2^{nd}$ speed-$3^{rd}$ speed simultaneous engagement state (this state is hereafter referred to as '$3^{rd}$ speed fixation state'). The planetary gear-type transmission 100 has the similar functions and effects to those of the parallel shaft-type transmission 60 discussed previously.

Figure 20:
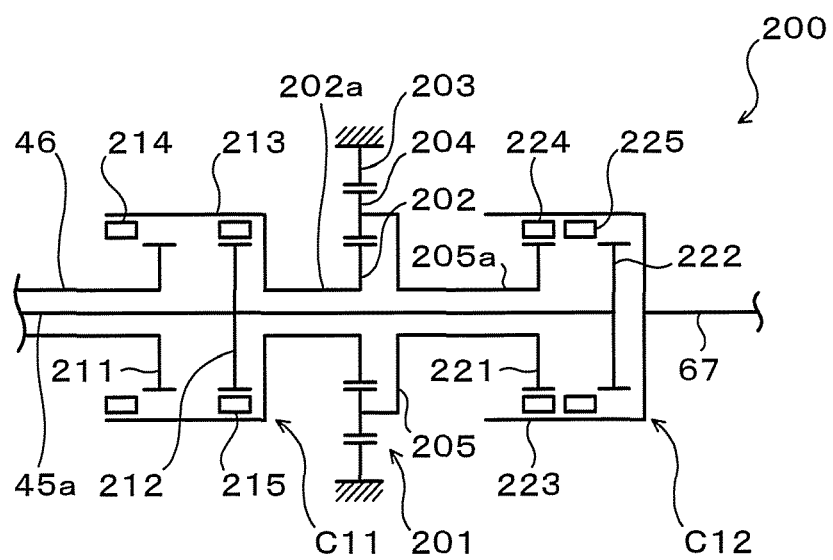
FIG. 20 shows a schematic block diagram of still another transmission 200 applicable to the hybrid vehicle 20 of the embodiment.

FIG. 20 shows the schematic structure of another planetary gear-type transmission 200 applicable to the hybrid vehicle 20 of the embodiment. The transmission 200 shown in FIG. 20 is also designed to have a speed change state (speed ratio) selectively changeable among multiple different stages and includes a speed-change differential rotation mechanism (speed reduction device) 201 and clutches C11 and C12. The speed-change differential rotation mechanism 201 is constructed as a single-pinion planetary gear mechanism including a sun gear 202 as an input element, a ring gear 203 as a fixation element fastened to a transmission casing in a non-rotatable manner and arranged concentrically with the sun gear 202, and a carrier 205 as an output element arranged to hold multiple pinion gears 204 engaging with both the sun gear 202 and the ring gear 203. The clutch C11 includes a first engagement element 211 provided on an end of the first motor shaft 46, a second engagement element 212 provided on the carrier shaft 45a, a third engagement element 213 provided on a hollow sun gear shaft 202a connected with the sun gear 202 of the speed-change differential rotation mechanism 201, a first movable engagement member 214 arranged to be movable in an axial direction along the first motor shaft 46 and the carrier shaft 45a and configured to engage with both the first engagement element 211 and the third engagement element 213, and a second movable engagement member 215 arranged to be movable in the axial direction and configured to engage with both the second engagement element 212 and the third engagement element 213. The first movable engagement member 214 and the second movable engagement member 215 are respectively actuated by an electric, electromagnetic, or hydraulic actuator (not shown). Adequate operations of the first movable engagement member 214 and the second movable engagement member 215 enable either one or both of the first motor shaft 46 and the carrier shaft 45a to be selectively connected with the sun gear 202 of the speed-change differential rotation mechanism 201. The clutch C12 includes a first engagement element 221 provided on an end of a hollow carrier shaft 205a, which is connected with the carrier 205 as the output element of the speed-change differential rotation mechanism 201 and is extended toward the rear end of the vehicle body, a second engagement element 222 provided on the carrier shaft 45a extended through the sun gear shaft 202a and the carrier shaft 205a, a third engagement element 223 provided on the driveshaft 67, a first movable engagement member 224 arranged to be movable in the axial direction along the first motor shaft 46 and the carrier shaft 45a and arranged to engage with both the first engagement element 221 and the third engagement element 223, and a second movable engagement member 225 arranged to be movable in the axial direction and configured to engage with both the second engagement element 222 and the third engagement element 223. The first movable engagement member 224 and the second movable engagement member 225 are respectively actuated by the electric, electromagnetic, or hydraulic actuator (not shown). Adequate operations of the first movable engagement member 224 and the second movable engagement member 225 enable either one or both of the carrier shaft 205a and the carrier shaft 45a to be selectively connected with the driveshaft 67.

The transmission 200 of this configuration has the speed change state (speed ratio) selectively changeable among the multiple different stages as discussed below. The connection of the carrier shaft 45a with the sun gear 202 of the speed-change differential rotation mechanism 201 by means of the clutch C11, in combination with the connection of the carrier shaft 205a with the driveshaft 67 by means of the clutch C12, causes the power from the carrier shaft 45a to be subjected to speed change at a specific speed ratio based on a gear ratio of the speed-change differential rotation mechanism 201 and to be transmitted to the driveshaft 67 (hereafter this state is referred to as 'first speed state ($1^{st}$ speed)'). The connection of the first motor shaft 46 with the sun gear 202 of the speed-change differential rotation mechanism 201 by means of the clutch C11, in combination with the connection of the carrier shaft 205a with the driveshaft 67 by means of the clutch C12, causes the power from the first motor shaft 46 to be subjected to speed change at the specific speed ratio based on the gear ratio of the speed-change differential rotation mechanism 201 and to be transmitted to the driveshaft 67 (hereafter this state is referred to as 'second speed state ($2^{nd}$ speed)'). The release of the clutch C11 for disconnecting both the carrier shaft 45a and the first motor shaft 46 from the sun gear shaft 202a, in combination with the connection of the carrier shaft 45a with the driveshaft 67 by means of the clutch C12, causes the power from the carrier shaft 45a to be transmitted to the driveshaft 67 at a speed ratio of 1 (hereafter this state is referred to as 'third speed state ($3^{rd}$ speed)'). In the first speed state of the transmission 200, the connection of both the carrier shaft 45a and the first motor shaft 46 with the driveshaft 67 by means of the clutch C11, in combination with the connection of the carrier shaft 205a with the driveshaft 67 by means of the clutch C12, causes the output power from the engine 22 or the output power from at least one of the motors MG1 and MG2 to be mechanically (directly) transmitted to the driveshaft 67 at a fixed speed ratio (first shift speed ratio) (hereafter this state is referred to as '$1^{st}$ speed-$2^{nd}$ speed simultaneous engagement state'). In the second speed state of the transmission 200, the connection of both the carrier shaft 45a and the first motor shaft 46 with the driveshaft 67 by means of the clutch C11, in combination with the connection of the carrier shaft 45a with the driveshaft 67 by means of the clutch C12, causes the output power from the engine 22 or the output power from at least one of the motors MG1 and MG2 to be mechanically (directly) transmitted to the driveshaft 67 at a fixed speed ratio (second shift speed ratio) that is different from the fixed speed ratio in the $1^{St}$ speed-$2^{nd}$ speed simultaneous engagement state discussed above (this state is hereafter referred to as '$2^{nd}$ speed-$3^{rd}$ speed simultaneous engagement state'). In the third speed state of the transmission 200, the non-rotatable fixation of the first motor shaft 46 or the sun gear 41 as the second element of the power distribution integration mechanism 40 to the transmission casing by means of a brake (not shown) causes the output power from the engine 22 or the output power from the motor MG2 to be mechanically (directly) transmitted to the driveshaft 67 at a fixed speed ratio that is different from the fixed speed ratios in the $1^{st}$ speed-$2^{nd}$ speed simultaneous engagement state and in the $2^{nd}$ speed-$3^{rd}$ speed simultaneous engagement state (this state is hereafter referred to as '$3^{rd}$ speed fixation state'). The planetary gear-type transmission 200 also has the similar functions and effects to those of the parallel shaft-type transmission 60 discussed previously.

Figure 21:
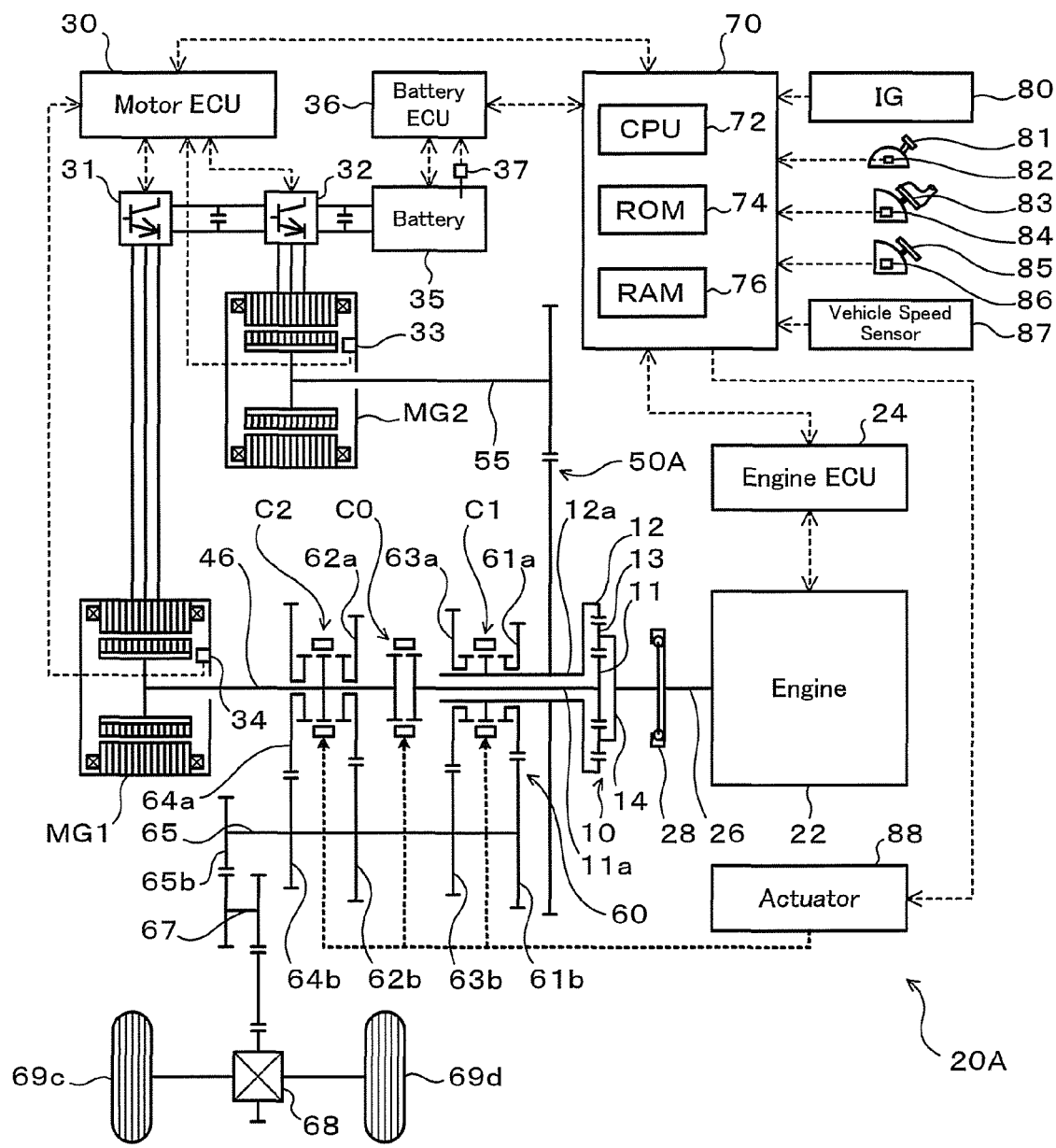
FIG. 21 is a schematic block diagram of a hybrid vehicle 20A of a modified example.

FIG. 21 schematically illustrates the configuration of a hybrid vehicle 20A as one modified example of the embodiment. While the hybrid vehicle 20 of the embodiment is constructed as a rear wheel-drive vehicle, the hybrid vehicle 20A of the modified example is constructed as a front wheel-drive vehicle. As shown in FIG. 21, the hybrid vehicle 20A is equipped with a power distribution integration mechanism 10 constructed as a single-pinion planetary gear mechanism including a sun gear 11, a ring gear 12 arranged concentrically with the sun gear 11, and a carrier 14 arranged to hold multiple pinion gears 13 engaging with both the sun gear 11 and the ring gear 12. The engine 22 is horizontally arranged, and the crankshaft 26 of the engine 22 is connected with the carrier 14 as a third element of the power distribution integration mechanism 10. The ring gear 12 as a first element of the power distribution integration mechanism 10 is connected with a hollow ring gear shaft 12a, which is connected to the motor MG2 via a reduction gear mechanism 50A constructed as a parallel shaft-type gear train and the second motor shaft 55 extended in parallel with the first motor shaft 46. Either the first speed gear train (gear 61a) or the third speed gear train (gear 63a) in the first speed change mechanism of the transmission 60 is selectively fixed to the ring gear shaft 12a by means of the clutch C1. The sun gear 11 as a second element of the power distribution integration mechanism 10 is connected with a sun gear shaft 11a. The sun gear shaft 11a passes through the hollow ring gear shaft 12a to be connected to the clutch C0 and is connectable with the first motor shaft 46 or the motor MG1 by means of the clutch C0. Either the second speed gear train (gear 62a) or the fourth speed gear train (gear 64a) in the second speed change mechanism of the transmission 60 is selectively fixed to the first motor shaft 46 by means of the clutch C2. As discussed above, the hybrid vehicle of the invention may have the configuration as the front-wheel drive vehicle.

The embodiment and its modified examples discussed above are to be considered in all aspects as illustrative and not restrictive. There may be many other modifications, changes, and alterations without departing from the scope or spirit of the main characteristics of the present invention.

The power distribution integration mechanism provided in the hybrid vehicle 20 may be constructed as a planetary gear mechanism including a first sun gear and a second sun gear having different numbers of teeth and a carrier arranged to hold at least one stepped gear formed by connection of a first pinion gear engaging with the first sun gear and a second pinion gear engaging with the second sun gear. In the structure of the embodiment discussed above, the clutch C0 is provided between the sun gear 41 as the second element of the power distribution integration mechanism 40 and the motor MG1 as the second motor to connect and disconnect the sun gear 41 with and from the motor MG1. The clutch C0 may be provided between the carrier 45 as the first element of the power distribution integration mechanism 40 and the motor MG2 as the first motor to connect and disconnect the carrier 45 with and from the motor MG2. The clutch C0 may otherwise be provided between the ring gear 42 as the third element of the power distribution integration mechanism 40 and the crankshaft 26 of the engine 22 to connect and disconnect the ring gear 42 with and from the crankshaft 26. Either of the hybrid vehicles 20 and 20A of the embodiment and its modified example discussed above may be constructed as a rear-wheel drive-based four-wheel drive vehicle or a front-wheel drive-based four-wheel drive vehicle. The above embodiment and its modified example describe the power output apparatuses mounted on the hybrid vehicles 20 and 20A. The power output apparatus of the invention is, however, not restrictively applied to such hybrid vehicles but may be mounted on diversity of moving bodies including various vehicles other than motor vehicles, boats and ships, and aircraft or may be built in stationary equipment, such as construction machinery.

INDUSTRIAL APPLICABILITY

The technique of the invention is applicable to the manufacturing industries of power output apparatuses and hybrid vehicles.

The invention claimed is:

1. A power output apparatus configured to output power to a driveshaft, the power output apparatus comprising:
an internal combustion engine;
a first motor constructed to input and output power;
a second motor constructed to input and output power;
an accumulator arranged to supply and receive electric power from each of the first motor and the second motor;
a power distribution integration mechanism configured to have a first element connected to a rotating shaft of the first motor, a second element connected to a rotating shaft of the second motor, and a third element connected to an engine shaft of the internal combustion engine, the power distribution integration mechanism allowing mutually differential rotations of the three elements;
a speed change-transmission assembly constructed to selectively connect either the first element or the second element of the power distribution integration mechanism to the driveshaft and set a speed change state selected among multiple different speed change states, the speed change-transmission assembly configured to, when a speed ratio between the engine shaft and the driveshaft becomes a predetermined shift speed ratio in an n-th speed state where one of the first element and the second element is connected to the driveshaft, shift the speed change state from the n-th speed state to an (n+1)-th speed state where the other of the first element and the second element is connected to the driveshaft so as to set the speed ratio between the engine shaft and the driveshaft to a smaller value;
a power demand setting module configured to set a power demand that is power required for the driveshaft;
a required speed ratio setting module configured to set a required speed ratio based on the set power demand and a predetermined restriction, the required speed ratio being a required value of the speed ratio between the engine shaft and the driveshaft; and
a speed change controller configured to, when the required speed ratio becomes equal to or less than a predetermined lower limit speed ratio that is less than the predetermined shift speed ratio during the n-th speed state of the speed change-transmission assembly, control the internal combustion engine, the first motor, the second motor, and the speed change-transmission assembly so as to ensure output of power equivalent to the set power demand to the driveshaft while performing an engine rotational speed adjustment of making a rotational speed of the engine shaft equal to a shift rotational speed corresponding to the shift speed ratio and a shift of the speed change state from the n-th speed state to the (n+1)-th speed state.

2. The power output apparatus in accordance with claim 1, wherein the predetermined restriction defines a relationship between operation points for efficiently operating the internal combustion engine and the power demand, and wherein the power output apparatus further comprises an operation point setting module configured to set the operation point of the internal combustion engine based on the set power demand and the predetermined restriction when the required speed ratio is more than the lower limit speed ratio during the n-th speed of the speed change-transmission assembly.

3. The power output apparatus in accordance with claim 2, wherein the operation point setting module sets a target rotational speed of the internal combustion engine to make the rotational speed of the engine shaft equal to the shift rotational speed and subsequently sets a target torque of the internal combustion engine in accordance with the set target rotational speed and a required power based on the set power demand so as to ensure output of the required power from the internal combustion engine during the engine rotational speed adjustment.

4. The power output apparatus in accordance with claim 1, wherein the lower limit speed ratio is defined to prevent a value of power transmission efficiency between the internal combustion engine and the driveshaft from being lower than a value of the power transmission efficiency in the (n+1)-th speed state when the speed ratio between the engine shaft and the driveshaft becomes the lower limit speed ratio during the n-th speed state.

5. The power output apparatus in accordance with claim 1, wherein the lower limit speed ratio is set based on the rotational speed of the engine shaft.

6. The power output apparatus in accordance with claim 1, wherein the lower limit speed ratio is set based on output power of the internal combustion engine.

7. The power output apparatus in accordance with claim 1, wherein the lower limit speed ratio is set with respect to each of the different speed change states of the speed change-transmission assembly.

8. The power output apparatus in accordance with claim 1, wherein the speed change controller controls the internal combustion engine, the first motor, and the second motor to make the speed ratio between the engine shaft and the driveshaft smaller than the lower limit speed ratio of the n-th speed state by a predetermined value and to ensure output of power equivalent to the set power demand to the driveshaft after the shift of the speed change state from the n-th speed state to the (n+1)-th speed state.

9. The power output apparatus in accordance with claim 1, wherein when the speed ratio between the engine shaft and the driveshaft becomes the predetermined shift speed ratio during the (n+1)-th speed state of the speed change-transmission assembly, the speed change-transmission assembly shifts the speed change state from the (n+1)-th speed state to the n-th speed state and sets the speed ratio between the engine shaft and the driveshaft to a greater value, and wherein when the required speed ratio becomes equal to or more than the predetermined shift speed ratio during the (n+1)-th speed state of the speed change-transmission assembly, the speed change controller controls the internal combustion engine, the first motor, the second motor, and the speed change-transmission assembly to ensure output of power equivalent to the set power demand to the driveshaft while performing an engine rotational speed adjustment of making the rotational speed of the engine shaft equal to the shift rotational speed and a shift of the speed change state from the (n+1)-th speed state to the n-th speed state.

10. The power output apparatus in accordance with claim 1, wherein the speed change-transmission assembly is a parallel shaft-type transmission including a first speed change mechanism having at least one parallel shaft-type gear train capable of connecting one of the first element and the second element of the power distribution integration mechanism to the driveshaft, and a second speed change mechanism having at least one parallel shaft-type gear train capable of connecting the other of the first element and the second element with the driveshaft.

11. The power output apparatus in accordance with claim 1, wherein the speed change-transmission assembly is a planetary gear-type transmission including a planetary gear mechanism capable of connecting one of the first element and the second element of the power distribution integration mechanism to the driveshaft, and a connection mechanism capable of connecting the other of the first element and the second element to the driveshaft.

12. A hybrid vehicle equipped with drive wheels driven with power from a driveshaft, the hybrid vehicle comprising:
an internal combustion engine;
a first motor constructed to input and output power;
a second motor constructed to input and output power;
an accumulator arranged to supply and receive electric power from each of the first motor and the second motor;
a power distribution integration mechanism configured to have a first element connected to a rotating shaft of the first motor, a second element connected to a rotating shaft of the second motor, and a third element connected to an engine shaft of the internal combustion engine, the power distribution integration mechanism allowing mutually differential rotations of the three elements;
a speed change-transmission assembly constructed to selectively connect either the first element or the second element of the power distribution integration mechanism to the driveshaft and set a speed change state selected among multiple different speed change states, the speed change-transmission assembly configured to, when a speed ratio between the engine shaft and the driveshaft becomes a predetermined shift speed ratio in an n-th speed state where one of the first element and the second element is connected to the driveshaft, shift the speed change state from the n-th speed state to an (n+1)-th speed state where the other of the first element and the second element is connected to the driveshaft so as to set the speed ratio between the engine shaft and the driveshaft to a smaller value;
a power demand setting module configured to set a power demand that is power required for the driveshaft;
a required speed ratio setting module configured to set a required speed ratio that is a required value of the speed ratio between the engine shaft and the driveshaft, based on the set power demand and a predetermined restriction; and
a speed change controller configured to, when the required speed ratio becomes equal to or less than a predetermined lower limit speed ratio that is less than the predetermined shift speed ratio during the n-th speed state of the speed change-transmission assembly, control the internal combustion engine, the first motor, the second motor, and the speed change-transmission assembly so as to ensure output of power equivalent to the set power demand to the driveshaft while performing an engine rotational speed adjustment of making a rotational speed of the engine shaft equal to a shift rotational speed corresponding to the shift speed ratio and a shift of the speed change state from the n-th speed state to the (n+1)-th speed state.

13. A control method of a power output apparatus, the power output apparatus including: a driveshaft; an internal combustion engine; a first motor constructed to input and output power; a second motor constructed to input and output power; an accumulator arranged to supply and receive electric power from each of the first motor and the second motor; a power distribution integration mechanism configured to have a first element connected to a rotating shaft of the first motor, a second element connected to a rotating shaft of the second motor, and a third element connected to an engine shaft of the internal combustion engine, the power distribution integration mechanism allowing mutually differential rotations of the three elements; and a speed change-transmission assembly constructed to selectively connect either the first element or the second element of the power distribution integration mechanism to the driveshaft and set a speed change state selected among multiple different speed change states, the speed change-transmission assembly configured to, when a speed ratio between the engine shaft and the driveshaft becomes a predetermined shift speed ratio in an n-th speed state where one of the first element and the second element is connected to the driveshaft, shift the speed change state from the n-th speed state to an (n+1)-th speed state where the other of the first element and the second element is connected to the driveshaft so as to set the speed ratio between the engine shaft and the driveshaft to a smaller value, the method comprising the steps of:
(a) determining whether or not a required speed ratio is equal to or less than a predetermined lower limit speed ratio that is less than the predetermined shift speed ratio during the n-th speed state of the speed change-transmission assembly, required speed ratio being set as a required value of the speed ratio between the engine shaft and the driveshaft based on a power demand required for the driveshaft and a predetermined restriction;
(b) making a rotational speed of the engine shaft equal to a shift rotational speed corresponding to the predetermined shift speed ratio when the step (a) determines that the required speed ratio is equal to or less than the predetermined lower limit speed ratio; and
(c) controlling the speed change-transmission assembly to shift the speed change state from the n-th speed state to the (n+1)-th speed state when the rotational speed of the engine shaft becomes the shift rotational speed.

14. The control method of the power output apparatus in accordance with claim 13, wherein the internal combustion engine, the first motor, and the second motor are controlled so as to ensure output of power equivalent to the power demand to the driveshaft during execution of the step (b) and the step (c).

* * * * *